United States Patent
Cochran, III et al.

(10) Patent No.: US 11,692,308 B2
(45) Date of Patent: *Jul. 4, 2023

(54) FLOOR COVERINGS AND FLOOR COVERING SYSTEMS AND METHODS OF MAKING AND INSTALLING SAME

(71) Applicant: COLUMBIA INSURANCE COMPANY, Omaha, NE (US)

(72) Inventors: Fain Alexander Cochran, III, Cartersville, GA (US); Jill Glascock Suhm, Marietta, GA (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 261 days.

This patent is subject to a terminal disclaimer.

(21) Appl. No.: 17/068,104

(22) Filed: Oct. 12, 2020

(65) Prior Publication Data

US 2021/0022534 A1 Jan. 28, 2021

Related U.S. Application Data

(63) Continuation of application No. 15/946,320, filed on Apr. 5, 2018, now Pat. No. 10,982,383.

(Continued)

(51) Int. Cl.
*A47G 27/02* (2006.01)
*D06N 7/00* (2006.01)
(Continued)

(52) U.S. Cl.
CPC ........... *D06N 7/0071* (2013.01); *A47G 27/02* (2013.01); *B32B 5/02* (2013.01); *B32B 7/12* (2013.01);
(Continued)

(58) Field of Classification Search
CPC .. D06N 7/0063; D06N 7/0068; D06N 7/0071; D06N 2203/042; D06N 2209/1664; D06N 2213/068; D06N 2211/066; Y10T 428/23929; B32B 7/05; B32B 3/02; B32B 3/06; B32B 3/08; B32B 3/10; B32B 7/12; B32B 5/02; B32B 27/12; B32B 27/32; B32B 2471/02; B32B 2250/44; E01C 13/08
(Continued)

(56) References Cited

U.S. PATENT DOCUMENTS

2017/0151761 A1* 6/2017 Segars .................... B32B 27/00

* cited by examiner

*Primary Examiner* — Cheryl Juska
(74) *Attorney, Agent, or Firm* — Ballard Spahr LLP

(57) ABSTRACT

Floor coverings having a greige good, an adhesive layer, and a secondary backing material. The greige good has a primary backing component having adjoined first and second portions, and a plurality of fibers. The secondary backing material has an attached portion and a first exposable portion, with the attached portion adhered to the first portion of the primary backing component by contact with the adhesive layer. The second portion of the primary backing component is unattached to the first exposable portion of the secondary backing material, and the first exposable portion defines a portion of the first end edge of the floor covering. The second portion of the primary backing component is selectively moveable relative to the first portion to a position in which at least a portion of the second portion of the primary backing component does not overlie the first exposable portion of the secondary backing material.

20 Claims, 5 Drawing Sheets

Related U.S. Application Data

(60) Provisional application No. 62/481,943, filed on Apr. 5, 2017.

(51) Int. Cl.
| | | |
|---|---|---|
| *C09J 7/40* | (2018.01) | |
| *E01C 13/08* | (2006.01) | |
| *B32B 5/02* | (2006.01) | |
| *B32B 27/12* | (2006.01) | |
| *B32B 27/32* | (2006.01) | |
| *B32B 27/40* | (2006.01) | |
| *B32B 27/36* | (2006.01) | |
| *B32B 27/30* | (2006.01) | |
| *B32B 27/08* | (2006.01) | |
| *B32B 7/12* | (2006.01) | |
| *C09J 7/22* | (2018.01) | |
| *C09J 7/30* | (2018.01) | |
| *C09J 123/06* | (2006.01) | |
| *C09J 123/08* | (2006.01) | |
| *C09J 123/12* | (2006.01) | |

(52) U.S. Cl.
CPC ............. *B32B 27/08* (2013.01); *B32B 27/12* (2013.01); *B32B 27/304* (2013.01); *B32B 27/32* (2013.01); *B32B 27/36* (2013.01); *B32B 27/40* (2013.01); *C09J 7/22* (2018.01); *C09J 7/30* (2018.01); *C09J 7/403* (2018.01); *C09J 7/405* (2018.01); *C09J 123/06* (2013.01); *C09J 123/0869* (2013.01); *C09J 123/12* (2013.01); *D06N 7/0081* (2013.01); *D06N 7/0092* (2013.01); *E01C 13/08* (2013.01); B32B 2307/7242 (2013.01); B32B 2307/7265 (2013.01); B32B 2471/02 (2013.01); C09J 2203/314 (2013.01); C09J 2301/40 (2020.08); C09J 2423/04 (2013.01); C09J 2423/045 (2013.01); C09J 2423/046 (2013.01); C09J 2423/10 (2013.01); C09J 2423/105 (2013.01); C09J 2423/106 (2013.01); C09J 2427/005 (2013.01); C09J 2433/00 (2013.01); C09J 2467/005 (2013.01); C09J 2467/006 (2013.01); C09J 2475/005 (2013.01); D06N 2213/068 (2013.01); D10B 2503/04 (2013.01); Y10T 428/23979 (2015.04)

(58) Field of Classification Search
USPC .......................................................... 428/88
See application file for complete search history.

FLOOR COVERINGS AND FLOOR COVERING SYSTEMS AND METHODS OF MAKING AND INSTALLING SAME

CROSS-REFERENCE TO RELATED APPLICATIONS

This application is a continuation of U.S. patent application Ser. No. 15/946,320, filed on Apr. 5, 2018, which claims priority to and the benefit of the filing date of U.S. Provisional Patent Application No. 62/481,943, which was filed on Apr. 5, 2017. Each of these earlier-filed applications is hereby incorporated by reference herein in its entirety.

FIELD

The present invention relates to floor coverings and floor covering systems having improved seaming capabilities for ease of welding and installation and to provide an impermeable barrier to fluid penetration.

BACKGROUND

Conventional floor coverings and floor covering systems have historically been manufactured to include a fully attached membrane composite. For example, floor coverings typically include a membrane composite having a primary backing component and a secondary backing material that can be adhered to the primary backing component across the full length of the floor covering. Attached to the primary backing component is typically a plurality of fibers extending from its face surface. The installation of floor coverings generally includes unrolling the floor covering material, cutting the material to the desired sizes, and adjoining adjacent floor covering materials by some manner and means. Various installation techniques have been utilized for adjoining adjacent floor coverings, including, for example, by overlapping an edge of a first floor covering with an edge of a second floor covering such that the first floor covering overlies the second floor covering. Once overlapped, a heat welding process can be employed to form a bond between the two floor coverings. However, these methods involve seaming of an attached membrane composite, which can create installation challenges and impede market acceptance. Typically, fibers become trapped in the overlapped region of adjoined floor coverings, resulting in an undesirable aesthetic appearance. Moreover, seaming of attached membrane composites often leads to problems with fluid penetration at the overlapped region.

SUMMARY

Described herein, in various aspects, are floor coverings having opposed first and second side edges and opposed first and second end edges extending between and oriented perpendicularly to the first and second side edges, the floor covering having a width corresponding to a distance between the first and second side edges and a length corresponding to a distance between the first and second end edges. The floor covering described herein comprises a greige good, an adhesive layer, and a secondary backing material. The greige good comprises a primary backing component defining a face surface and an opposed back surface and having a first portion and a second portion adjoining the first portion. The first and second portions of the primary backing component extend along respective portions of the length of the floor covering. The greige good further comprises a plurality of fibers attached to the primary backing component and extending from the face surface of the primary backing component. The adhesive layer includes a first surface and an opposed second surface and comprises an adhesive composition. The first surface of the adhesive layer is applied to the back surface of the first and second portions of the primary backing component. The secondary backing material comprises an attached portion and at least a first exposable portion. The attached portion is adhered to the first portion of the primary backing component by contact with the second surface of the adhesive layer. The second portion of the primary backing component is unattached to the first exposable portion of the secondary backing material. The first exposable portion defines a portion of the first end edge of the floor covering. The second portion of the primary backing component is selectively moveable relative to the first portion of the primary backing component to a position in which at least a portion of the second portion of the primary backing component does not overlie the first exposable portion of the secondary backing material. Also described herein are floor covering systems comprising the disclosed floor coverings, as well as methods of making and installing the disclosed floor coverings.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE DRAWINGS

These and other features of the preferred embodiments of the invention will become more apparent in the detailed description in which reference is made to the appended drawings wherein:

FIG. 5A shows exemplary first and second floor coverings positioned adjacent to one another, each having a moveable body in the closed position as disclosed herein. FIG. 5B shows the exemplary first and second floor coverings with each moveable body in the open position as disclosed herein. FIG. 5C shows the exemplary first and second floor coverings, each having a secondary backing material with an exposable portion as disclosed herein. FIG. 5C further shows overlapping of the exposable portions of the exemplary first and second floor coverings as disclosed herein. FIG. 5D shows the overlapped region of the secondary backing materials of the exemplary first and second floor coverings heat welded, forming a continuous barrier as disclosed herein. FIG. 5E shows the exemplary first and second floor coverings, with each moveable body moved to the closed position following application of heat as disclosed herein. As further disclosed herein, after positioning of the moveable bodies in the closed position, the moveable bodies can be welded or otherwise secured together.

DETAILED DESCRIPTION

Figure 1:
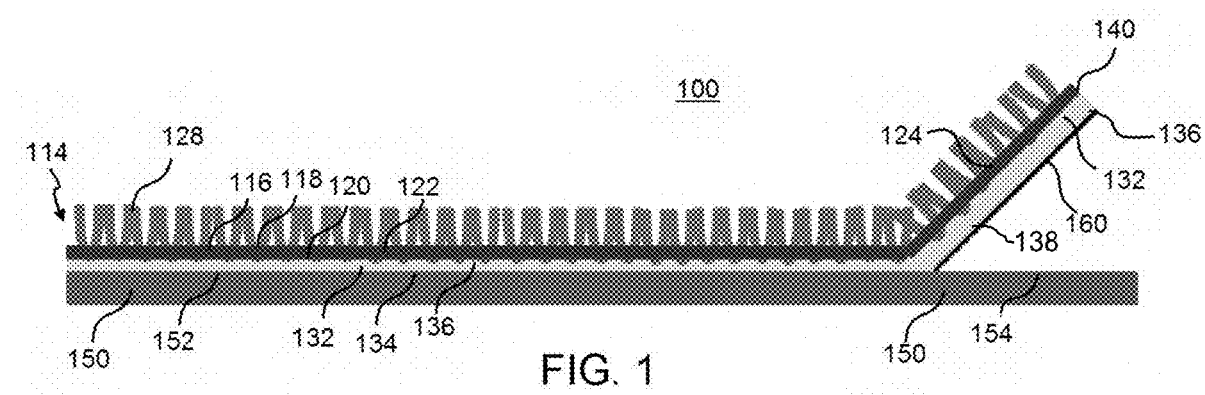
FIG. 1 shows a cross-sectional side view of an exemplary floor covering having a moveable body as disclosed herein.

The present invention can be understood more readily by reference to the following detailed description, examples, drawings, and claims, and their previous and following description. However, before the present compositions, articles, devices, systems, and/or methods are disclosed and described, it is to be understood that this invention is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

In the following description, numerous specific details are set forth in order to provide a thorough understanding described herein. It will be obvious, however, to one skilled in the art that the present disclosure may be practiced without these specific details. In other instances, well-known aspects of carpet manufacture and artificial turf have not been described in particular detail in order to avoid unnecessarily obscuring aspects of the disclosed implementations.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used herein, the singular forms "a," "an" and "the" include plural referents unless the context clearly dictates otherwise. Thus, for example, reference to a "secondary backing material" includes aspects having two or more secondary backing materials unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event or circumstance may or may not occur, and that the description includes instances where said event or circumstance occurs and instances where it does not.

As used herein, the terms "floor covering" and "carpet" are used interchangeably, and in the manner as would be recognized by one of ordinary skill in the art. The definition of floor covering and carpet, as used herein, includes any floor coverings, carpets, or carpet products known in the art. For example and without limitation, the terms "floor covering" and "carpet" include carpet tiles, rugs, turfs. As an example, and without limitation, the terms "floor covering" and "carpet tile" include tiles formed from broadloom textile flooring products that are provided in roll form.

As used herein, the term "by weight," when used in conjunction with a component, unless specially stated to the contrary is based on the total weight of the formulation or composition in which the component is included. For example, if a particular element or component in a composition or article is said to have 8% by weight, it is understood that this percentage is in relation to a total compositional percentage of 100%.

A weight percent of a component, or weight %, or wt. %, unless specifically stated to the contrary, is based on the total weight of the formulation or composition in which the component is included.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

As used herein, the term "substantially," in, for example, the context "substantially free" refers to a composition having less than about 1% by weight, e.g., less than about 0.5% by weight, less than about 0.1% by weight, less than about 0.05% by weight, or less than about 0.01% by weight of the stated material, based on the total weight of the composition.

It is further understood that the term "substantially," when used in reference to a composition, refers to at least about 60% by weight, e.g., at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, or about 100% by weight, based on the total weight of the composition, of a specified feature or component.

As used herein, the term "substantially," in, for example, the context "substantially identical reference composition," refers to a reference composition comprising substantially identical components in the absence of an inventive component. In another exemplary aspect, the term "substantially," in, for example, the context "substantially identical reference composition," refers to a reference composition comprising substantially identical components and wherein an inventive component is substituted with a common in the art component. For example, a substantially identical reference carpet composition can comprise a substantially identical plurality of reference fibers attached to the reference primary backing material and extending the face of the reference primary backing material and exposed at the back side of the reference primary backing material, a reference precoat composition comprising latex, and wherein a thermoplastic dispersion is absent from the precoat composition; and a substantially identical reference secondary backing material applied to a back surface of the reference precoat layer; and a substantially identical polymer film.

As used herein, the term "substantially," in, for example, the context "substantially similar wet and dry delamination strength," refers to values of wet delamination strength that are different from values of dry delamination strength by about 30% or less, by about 20% or less, by about 10% or less, by about 5% or less, by about 1% or less, or by about 0.5% or less.

The term "fiber" as used herein includes fibers of extreme or indefinite length (i.e. filaments) and fibers of short length (i.e., staple fibers).

The term "yarn" as used herein refers to a continuous strand, length, or bundle of fibers. The fibers can be any type of fiber as described herein.

As used herein, the term "copolymer" refers to a polymer formed from two or more different repeating units (monomer residues). By way of example and without limitation, a copolymer can be an alternating copolymer, a random copolymer, a block copolymer, or a graft copolymer.

The term "linear" as used to describe ethylene polymers is used herein to mean the polymer backbone of the ethylene polymer lacks measurable or demonstrable long chain branches, e.g., the polymer is substituted with an average of less than 0.01 long branch/1000 carbons.

The term "homogeneous ethylene polymer" as used to describe ethylene polymers is used in the conventional sense in accordance with the original disclosure by Elston in U.S. Pat. No. 3,645,992, the disclosure of which is incorporated herein by reference. As defined herein, homogeneous ethylene polymers include both substantially linear ethylene polymers and homogeneously branched linear ethylene.

Homogeneously branched ethylene polymer is homogeneous ethylene polymer that refers to an ethylene polymer in which the monomer or comonomer is randomly distributed within a given polymer or interpolymer molecule and wherein substantially all of the polymer or interpolymer molecules have substantially the same ethylene to comonomer molar ratio with that polymer or interpolymer.

Alternatively, homogeneously branched ethylene polymers can be defined as homogeneous ethylene polymers that possess short chain branches and characterized by a relatively high short chain branching distribution index (SCBDI) or relatively high composition distribution branching index (CDBI). That is, the ethylene polymer has a SCBDI or CDBI greater than or equal to 50 percent, greater than or equal to 70 percent, or greater than or equal to 90 percent and essentially lack a measurable high density (crystalline) polymer fraction.

In the aspects wherein the homogeneously branched ethylene polymers are characterized by the short chain branching distribution index or composition distribution branching index, the SCBDI or CDBI can be defined as the weight percent of the polymer molecules having a comonomer content within 50 percent of the median total molar comonomer content and represents a comparison of the comonomer distribution in the polymer to the comonomer distribution expected for a Bernoullian distribution. The SCBDI or CDBI of polyolefins can be conveniently calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), L. D. Cady, "The Role of Comonomer Type and Distribution in LLDPE Product Performance," SPE Regional Technical Conference, Quaker Square Hilton, Akron, Ohio, October 1-2, pp. 107-119 (1985), or in U.S. Pat. Nos. 4,798,081 and 5,008,204, the disclosures of all of which are incorporated herein by reference. In some aspects, the comonomer distribution of the polymer and SCBDI or CDBI are determined using $^{13}$CNMR analysis in accordance with techniques described, for example, in U.S. Pat. No. 5,292,845 and by J. C Randall in Rev. Macromol. Chem. Phys., C29, pp. 201-317, the disclosures of which are incorporated herein by reference.

In some aspects, the terms "homogeneously branched linear ethylene polymer" and "homogeneously branched linear ethylene/α-olefin polymer" means that the olefin polymer has a homogeneous or narrow short branching distribution but does not have long chain branching. That is, the linear ethylene polymer is a homogeneous ethylene polymer characterized by an absence of long chain branching. Such polymers can be made using polymerization processes (e.g., as described by Elston in U.S. Pat. No. 3,645,992) which provide a uniform short chain branching distribution (i.e., homogeneously branched). Homogeneously branched linear ethylene polymers are typically characterized as having a molecular weight distribution, $M_w/M_n$, of less than about 3, less than about 2.8, or less than about 2.3. Commercial examples of suitable homogeneously branched linear ethylene polymers include those sold by Mitsui Petrochemical Industries as Tafmer™ resins and by Exxon Chemical Company as Exact™ resins and Exceed™ resins. Alternatively, the terms "homogeneously branched linear ethylene polymer" and "homogeneously branched linear ethylene/α-olefin polymer" means that the olefin polymer has a relatively high SCBDI or CDBI.

The terms "homogeneous linearly branched ethylene polymer" or "homogeneously branched linear ethylene/α-olefin polymer" do not refer to high pressure branched polyethylene which is known to those skilled in the art to have numerous long chain branches. The term "homogeneous linear ethylene polymer" generically refers to both linear ethylene homopolymers and to linear ethylene/α-olefin interpolymers. A linear ethylene/α-olefin interpolymer possesses short chain branching and the α-olefin is typically at least one $C_3$-$C_{20}$ α-olefin (e.g., propylene, 1-butene, 1-pentene, 4-methyl-1-pentene, 1-hexene, and 1-octene). In other aspects the polyethylenes that are suitable for use in the present invention are interpolymers of ethylene with at least one $C_3$-$C_{20}$ α-olefin and/or $C_4$-$C_{18}$ diolefin. Copolymers of ethylene and α-olefin of $C_3$-$C_{20}$ carbon atoms can be used.

The term "interpolymer" is used herein to indicate a copolymer, or a terpolymer, or the like, where at least one other comonomer is polymerized with ethylene to make the interpolymer. Suitable unsaturated comonomers useful for polymerizing with ethylene include, for example, ethylenically unsaturated monomers, conjugated or non-conjugated dienes, polyenes, etc. Examples of such comonomers include $C_3$-$C_{20}$ α-olefins as propylene, isobutylene, 1-butene, 1-hexene, 4-methyl-1-pentene, 1-heptene, 1-octene, 1-nonene, 1-decene, 1,9-decadiene and the like. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

When used in reference to an ethylene homopolymer (i.e., a high density ethylene polymer not containing any comonomer and thus no short chain branches), the term "homogeneous ethylene polymer" or "homogeneous linear ethylene polymer" means the polymer was made using a homogeneous catalyst system such as, for example, that described Elston or Ewen or those described by Canich in U.S. Pat. Nos. 5,026,798 and 5,055,438, or by Stevens et al. in U.S. Pat. No. 5,064,802, the disclosures of all three of which are incorporated herein by reference.

The terms "substantially linear ethylene polymer" or "SLEP," are used interchangeably, and refer specifically to homogeneously branched ethylene polymers that have long chain branching. The term does not refer to heterogeneously or homogeneously branched ethylene polymers that have a linear polymer backbone. For substantially linear ethylene polymers, the long chain branches have the same comonomer distribution as the polymer backbone, and the long chain branches can be as long as about the same length as the length of the polymer backbone to which they are attached. The polymer backbone of substantially linear ethylene polymers is substituted with about 0.01 long chain branches/1000 carbons to about 3 long chain branches/1000 carbons, from about 0.01 long chain branches/1000 carbons to about 1 long chain branches/1000 carbons, and from about 0.05 long chain branches/1000 carbons to about 1 long chain branches/1000 carbons.

Long chain branching is defined herein as a chain length of at least 6 carbons, above which the length cannot be distinguished using $^{13}C$ nuclear magnetic resonance spectroscopy. The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, p. 285-297), the disclosure of which is incorporated herein by reference.

Substantially linear ethylene polymers are homogeneously branched ethylene polymers and are disclosed in U.S. Pat. Nos. 5,272,236 and 5,278,272, the disclosures of which are incorporated herein by reference. Homogeneously branched substantially linear ethylene polymers are available from The Dow Chemical Company as AFFINITY™ polyolefin plastomers and from Dupont Dow Elastomers JV as ENGAGE™ polyolefin elastomers. Homogeneously branched substantially linear ethylene polymers can be prepared via the solution, slurry, or gas phase polymerization of ethylene and one or more optional α-olefin comonomers in the presence of a constrained geometry catalyst, such as the method disclosed in European Patent Application 416,815-A, the disclosure of which is incorporated herein by reference. In some aspects, a solution polymerization process is used to manufacture the substantially linear ethylene polymer used in the present invention.

The term "heterogeneously branched ethylene polymer" refers to a polymer having a distribution of branching different from and broader that the homogeneous branching ethylene/α-olefin interpolymer at similar molecular weight. In further aspects, the "heterogeneous" and "heterogeneously branched" mean that the ethylene polymer is characterized as a mixture of interpolymer molecules having various ethylene to comonomer molar ratios. Alternatively, heterogeneously branched linear ethylene polymers can be defined as having a SCBDI less than about 50% and more typically less than about 30%. HBEPs and SLEPs also differ from the class of polymers known conventionally as heterogeneously branched traditional Ziegler polymerized linear ethylene interpolymers, for example, ultra-low density polyethylene ("ULDPE"), very low density polyethylene ("VLDPE"), linear low density polyethylene ("LLDPE") medium density polyethylene ("MDPE") or high density polyethylene ("HDPE") made, for example, using the technique disclosed by Anderson et al. in U.S. Pat. No. 4,076,698, in that substantially linear ethylene interpolymers are homogeneously branched interpolymers. Further, in accordance with the present invention, the polymer composition does not comprise more than 20% by weight of heterogeneously branched linear ethylene polymers, as measured by the total weight of the polymer composition.

Heterogeneously branched ethylene polymers are typically characterized as having molecular weight distributions, $M_w/M_n$ in the range of from about 3.5 to about 4.1 and, as such, are distinct from substantially linear ethylene polymers and homogeneously branched linear ethylene polymers in regards to both compositional short chain branching distribution and molecular weight distribution.

The substantially linear ethylene polymers useful in this invention have excellent processability, even though they have relatively narrow molecular weight distributions (MWDs). Furthermore, the melt flow ratio ($I_{10}/I_2$) of the substantially linear ethylene polymers can be varied essentially independently of the polydispersity index (i.e., molecular weight distribution ($M_w/M_n$)). This is contrasted with conventional heterogeneously branched linear polyethylene resins which have rheological properties such that as the polydispersity index increases, the $I_{10}/I_2$ value also increases. The rheological properties of substantially linear ethylene polymers also differ from homogeneously branched linear ethylene polymers which have relatively low, essentially fixed $I_{10}/I_2$ ratios.

HBEPs and SLEPs also differ significantly from the class known as free-radical initiated highly branched high pressure low density ethylene homopolymer and ethylene interpolymers such as, for example, ethylene-acrylic acid (EAA) copolymers and ethylene-vinyl acetate (EVA) copolymers, in that substantially linear ethylene polymers do not have equivalent degrees of long chain branching and are made using single site catalyst systems rather than free-radical peroxide catalyst systems. In accordance with the present invention, the polymer composition does not comprise more than 20% by weight of free-radical initiated highly branched high pressure low density ethylene homopolymer and ethylene interpolymers, as measured by the total weight of the polymer composition, exclusive of any adhesive polymer that contains such homopolymers and interpolymers (as discussed in more detail below).

In some aspects of the present invention, certain component parts of the disclosed floor coverings are characterized as including woven materials or woven textile. It should be understood that in some aspects woven textiles have the appearance of two-sets of parallel threads or yarns interlaced at generally right angles to each other in the plane of the fabric. "Warp" yarns or threads lie along the length of the fabric and "weft" yarns lie in the transverse direction, i.e. across the width of the fabric. The type of yarns used to produce a woven textile can include, without limitation, monofilament, multifilament, a combination of monofilament and multifilament, spun yarns, tape or slit film yarns, or a combination of tape and spun yarns. In some aspects of the invention, the term "tape-spun" yarn refers to yarn having a slit film yarn in the warp direction and spun (relatively short staple length) yarn in the weft direction. In other aspects of the invention, the term "tape-tape" yarn refers to yarn having a slit film yarn both in the warp and the weft directions.

As described herein, the term "impermeable" refers to materials that do not allow the disclosed substances to pass through it. For example, and without limitation, a fluid impermeable material can be impermeable to both liquids and gases.

As described herein, the term "semipermeable" refers to materials that do not allow certain substances to permeate but do allow certain other specified materials to pass through it. For example, and without limitation, a semipermeable fluid barrier can be permeable to gases and impermeable to liquids, or vice versa.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

A. Floor Coverings

As summarized above and with reference to FIGS. 1-6, aspects of the invention disclosed herein provide a floor covering 100 having opposed first and second side edges 102, 104 and opposed first and second end edges 106, 108 extending between and oriented perpendicularly to the first and second side edges. In these aspects, it is contemplated that the floor covering 100 can have a width 110 corresponding to a distance between the first and second side edges 102, 104 and a length 112 corresponding to a distance between the first and second end edges 106, 108. In further aspects, the floor covering 100 can comprise a greige good 114, an adhesive layer 132, and a secondary backing material 150. The greige good 114 can comprise a primary backing component 116, which can have a face surface 118 and an opposed back surface 120. The primary backing component 116 also can have a first portion and a second portion 122, 124 adjoining the first portion. The first and second portions of the primary backing component 116 can extend along respective portions of the length 112 of the floor covering 100. In exemplary aspects, it is contemplated that the floor covering 100 can comprise two primary backing components or layers 116, with the back surface 120 of a primary backing component abutting the face surface 118 of another primary backing component. In exemplary aspects, it is further contemplated that the floor covering 100 can comprise a plurality of primary backing components or layers that are positioned in a stacked configuration. Optionally, the plurality of primary backing materials can be stacked without the need for adhesive layers between the respective primary backing materials. The greige good 114 can further comprise a plurality of fibers 128 attached to the primary backing component 116 and extending from the face surface 118 of the primary backing component 116. In additional aspects, the adhesive layer 132 can have a first surface 134 and an opposed second surface 136. In these aspects, the adhesive layer 132 can comprise an adhesive composition 138. The first surface 134 of the adhesive layer 132 can be applied to the back surface 120 of the first and second portions 122, 124 of the primary backing component 116. As shown in FIG. 1, the portion of the adhesive layer 132 applied to the second portion 124 of the primary backing component 116 and the second portion 124 of the primary backing component 116 can cooperate to define a moveable body 140. Optionally, it is contemplated that the moveable body 140 can be provided as a flap. In further aspects, the secondary backing material 150 can have an attached portion 152 and at least a first exposable portion 154. In these aspects, the attached portion 152 can be adhered (coupled) to the first portion 122 of the primary backing component 116 by contact with the second surface 136 of the adhesive layer 132 underlying the first portion 122 of the primary backing component 116. In these aspects, the moveable body can be unattached to the first exposable portion 154 of the secondary backing material 150. The first exposable portion 154 can define a portion of the first end edge 106 of the floor covering 100. It is contemplated that the moveable body 140 can be selectively moveable relative to the first portion 122 of the primary backing component 116 to a position in which at least a portion of the second surface 136 of the adhesive layer 132 of the moveable body 140 can be vertically spaced from the first exposable portion 154 of the secondary backing material 150. Optionally, it is contemplated that the secondary backing material 150 can comprise a multi-layer secondary backing material. Optionally, it is further contemplated that the floor covering 100 can comprise a plurality of secondary backing materials 150 (i.e., multiple, stacked secondary backing materials). Optionally, when a plurality of secondary backing materials is provided, it is contemplated that additional adhesive layers can be provided between sequential secondary backing materials. However, such adhesive layers are not required and can be omitted when appropriate.

As further described herein, it is contemplated that the floor covering 100 can further comprise a sealing material 160 disposed onto the second surface 136 of the adhesive layer 132 of the moveable body 140. In these aspects, the sealing material 160 can be configured to create a barrier between the adhesive layer 132 of the moveable body 140 and the first exposable portion 154 of the secondary backing material 150. It is contemplated that the sealing material 160 can be any material that can encapsulate the adhesive layer 132 of the moveable body 140 and prevent the moveable body from adhering to the exposable portion 154 of the secondary backing material 150. For example and without limitation, the sealing material 160 can comprise a polyethylene film, as further described herein.

In exemplary aspects, it is contemplated that the moveable body can be configured for selective pivotal movement relative to the first portion 122 of the primary backing component 116 such that the moveable body 140 can be moveable about and between a closed position and an open position. In the closed position, the moveable body can overlie the first exposable portion 154 of the secondary backing material 150 and cooperate with the first exposable portion 154 to define the first end edge 106 of the floor covering 100. In these aspects, the moveable body 140 can be configured to pivot about a pivot axis 162 defined at an intersection 164 between the first and second portions 122, 124 of the primary backing component 116 such that the moveable body 140 can be moveable between the closed position and the open position. It is contemplated that the pivot axis 162 can be perpendicular or substantially perpendicular to a longitudinal axis 166 of the floor covering 100 extending from the first end edge 106 to the second end edge 108. In the open position, the second portion 124 of the primary backing component 116 can be advanced (e.g., folded) inwardly toward the first portion 122 of the primary backing component 116. In the open position, at least a portion of the second surface 136 of the adhesive layer 132 of the moveable body 140 can be vertically spaced from the first exposable portion 154 of the secondary backing material 150 as further disclosed herein. Optionally, in the open position, the moveable body 140 can be advanced (e.g., folded) inwardly such that a portion of the adhesive layer 132 of the moveable body overlies the attached portion 152 of the secondary backing material 150 (and does not overlie the first exposable portion 154). The pivot axis 162 can be spaced from the first end edge 106 by a selected distance corresponding to a length of the moveable body. In these aspects, it is contemplated that the selected distance can range from about 1 inch to about 25 inches. More particularly, the selected distance can range from about 5 inches to about 20 inches, or from about 6 inches to about 18 inches.

Figure 2:
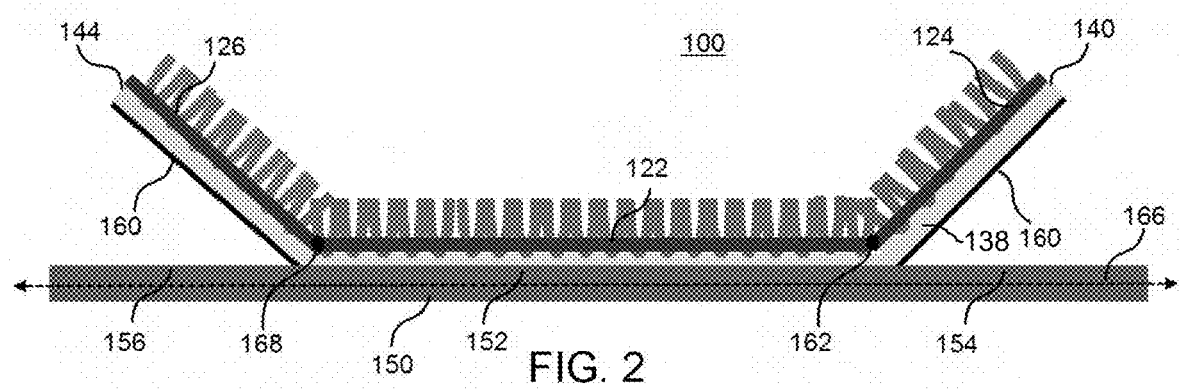
FIG. 2 shows a cross-sectional side view of another exemplary floor covering having first and second moveable bodies as disclosed herein.

In further exemplary aspects and with reference to FIG. 2, the primary backing component 116 can comprise a third portion 126 adjoining the first portion 122 of the primary backing component 116. In these aspects, the first, second, and third portions 122, 124, 126 of the primary backing component 116 can extend along respective portions of the length 112 of the floor covering 100 such that the first portion 122 can be positioned between the second and third portions 124, 126 relative to the length 112 of the floor covering 100. The first surface 134 of the adhesive layer 132 can be applied to the back surfaces 120 of the first, second, and third portions 122, 124, 126 of the primary backing component 116. The portions of the adhesive layer 132 applied to the second and third portions 124, 126 of the primary backing component 116 and the second and third portions 124, 126 of the primary backing component 116 can cooperate to define respective first and second moveable bodies 140, 144. The secondary backing material 150 can further comprise a second exposable portion 156. The second moveable body 144 can be unattached to and configured to overlie the second exposable portion 156 of the secondary backing material 150. The second exposable portion 156 can define a portion of the second end edge 108 of the floor covering 100. The second moveable body 144 can be selectively moveable relative to the first portion 122 of the primary backing component 116 to a position in which at least a portion of the second surface 136 of the adhesive layer 132 of the second moveable body 144 can be vertically spaced from the second exposable portion 156 of the secondary backing material 150.

As disclosed herein, the floor covering 100 can comprise a sealing material 160 disposed onto the second surface 136 of the adhesive layer 132 of the moveable body 140. Optionally, in exemplary aspects having first and second moveable bodies 140, 142, the sealing material 160 can be disposed onto the second surfaces 136 of the adhesive layer 132 applied to first and second moveable bodies. In these aspects, the sealing material 160 can be configured to create a barrier between the adhesive layer 132 of the first and second moveable bodies 140, 144 and the first and second exposable portions 154, 156 of the secondary backing material 150.

It is contemplated that the second moveable body can be configured for selective pivotal movement relative to the first portion 122 of the primary backing component 116 such that the second moveable body 144 can be moveable about and between a closed position and an open position. In the closed position, the second moveable body 144 can overlie the second exposable portion 156 of the secondary backing material 150 and can cooperate with the second exposable portion 156 to define the second end edge 108 of the floor covering 100. In further aspects, the second moveable body can be configured to pivot about a pivot axis 168 defined at an intersection 170 between the first and third portions 122, 126 of the primary backing component 116 such that the second moveable body 144 can be moveable between the closed position and the open position. It is contemplated that the pivot axis 168 can be perpendicular to a longitudinal axis 166 of the floor covering 100 extending from the first end edge 106 to the second end edge 108. In the open position, the second moveable body 144 can be advanced (e.g., folded) inwardly toward the first portion 122 of the primary backing component 166. In the open position, at least a portion of the second surface 136 of the adhesive layer 132 of the second moveable body 144 can be vertically spaced from the second exposable portion 156 of the secondary backing material 150 as further disclosed herein. Optionally, in the open position, the second moveable body 144 can be advanced (e.g., folded) inwardly such that a portion of the adhesive layer 132 of the second moveable body 144 overlies the attached portion 152 of the secondary backing material 150 (and does not overlie the second exposable portion 156). In these aspects, the pivot axis 168 at the intersection 170 of the first and third portions 122, 126 of the primary backing component 116 can be spaced from the second end edge 108 by a selected distance corresponding to a length of the second moveable body 144.

In exemplary aspects, the primary backing component 116 can comprise polypropylene, polyethylene terephthalate, polyethylene, or a combination thereof. Optionally, the primary backing component 116 comprises polypropylene.

In certain aspects, the primary backing component 116 can comprise a polyolefin, a polyester, a polyamide, or combinations thereof. The primary backing component can be woven and non-woven. In certain aspects, the primary backing component can comprise non-woven webs, or spunbonded materials. In some aspects, the primary backing component can comprise a combination of woven and non-woven materials. In some aspects, the primary backing component can comprise a polyolefin polymer. Optionally, the polyolefin polymer can comprise polypropylene. In yet other aspects, the primary backing component can be a slit film polypropylene sheet such as that sold by Propex or Synthetic Industries owned by Shaw Industries. In yet further aspects, the primary backing component can comprise polyester. In still further aspect, the primary backing component can comprise polyamide. In yet further aspects, the primary backing component can comprise a combination of polyamide and polyester. In these aspects, the polyamide can be nylon. In additional aspects, the primary backing can comprise a woven polyethylene terephthalate (PET). In yet other aspects, the primary backing can comprise a woven PET having a post-consumer and/or post-industrial content.

In some exemplary aspects, the primary backing component 116 can be a spun-bond primary backing component. The spun bond backing can be produced by depositing extruded, spun filaments onto a collecting belt in a uniform random manner followed by bonding the fibers. The fibers are separated during the web laying process by air jets or electrostatic charges. The collecting surface is usually perforated to prevent the air stream from deflecting and carrying the fibers in an uncontrolled manner. Bonding imparts strength and integrity to the web by applying heated rolls or hot needles to partially melt the polymer and fuse the fibers together. Since molecular orientation increases the melting point, fibers that are not highly drawn can be used as thermal binding fibers. In some aspect, the spun-bond primary backing component can comprise a bi-component filament of a sheath-core type. In further aspects, the polymeric core component can have a higher melting point than the polymeric sheath component. In some aspects, the polymeric core component can comprise polyester, aliphatic polyamides, polyphenylene oxide and/or co-polymers or blends thereof. Optionally, the polyester can comprise polyethylene terephthalate, polybutylene terephthalate, or polyparaphenylene terephthalamide. In some aspects, the polymeric core can comprise polyethylene terephthalate. In still further aspects, the sheath polymer can comprise a polyamide, polyethylene, or polyester. In some aspects, the sheath polymer comprises nylon. In still further aspects, the sheath-core primary backing component can comprise a polyester as a core component and nylon as a sheath component. The exemplary sheath-core primary backing component can be commercially available from Bonar. In yet other aspects, a polyester non-woven primary backing can be commercially available from Freudenberg.

Optionally, in exemplary aspects, the greige good 114 can comprise a precoat layer 130 (not shown) disposed between the back surface 120 of the primary backing component 116 and the adhesive layer 132. In these aspects, the precoat layer 130 can at least partially encapsulate the plurality of fibers 128 of the greige good 114. In some aspects, the precoat layer 130 can comprise latex. In other aspects, the precoat layer 130 can comprise SBR latex. In further aspects, the precoat layer 130 can comprise VAE latex. In still further aspects, the precoat layer 130 can comprise EVA latex. Optionally, in other exemplary aspects, the precoat layer 130 can comprise an acrylic material.

The disclosed floor covering 100 can further comprise an adhesive layer 132 comprising an adhesive composition 138 applied to the back surface 120 of the primary backing component 116. As noted above, in some aspects, the back surface 120 of the primary backing component 116 can have a precoat layer 130 applied thereto such that the adhesive composition 138 is applied subsequent to the application of the precoat layer 130. In other aspects where a precoat layer 130 is not present, the adhesive composition 138 can be applied directly to the back surface 120 of the primary backing component 116. The adhesive composition 138 can be provided by any means known to one of ordinary skills in the art, including, but not limited to, a dispensing apparatus, an extrusion station, a sprayer for a liquefied adhesive composition, or a lick roll rotating with a pan, which contains the liquefied adhesive composition. Nip rollers can be heated by any means that are known to those having ordinary skill in the art to which the invention relates.

In exemplary aspects, the adhesive layer can comprise a thermoplastic elastomer. Optionally, the thermoplastic elastomer can be a homogeneously branched ethylene polymer. Optionally, the thermoplastic elastomer can be a polyethylene elastomer. Optionally, the thermoplastic elastomer can be a polypropylene elastomer. Optionally, the thermoplastic elastomer can be an ethylene methyl acrylate (EMA) elastomer. In one exemplary aspect, the thermoplastic elastomer can be VISTAMAXX™ 6202, which is manufactured by ExxonMobil Chemical Company. In another exemplary aspect, the thermoplastic elastomer can be an AFFINITY™ polyolefin plastomer manufactured by the Dow Chemical Company. In a further exemplary aspect, the thermoplastic elastomer can be an ENGAGE™ polyolefin elastomers manufactured by Dupont Dow Elastomers JV.

As further disclosed herein, the floor covering 100 can comprise a secondary backing material 150 having an attached portion 152 and at least a first exposable portion 154. The attached portion 152 can be adhered to the first portion 122 of the primary backing component 116 by contact with the second surface 136 of the adhesive layer 132, and the second portion 124 of the primary backing component 116 can be unattached to the first exposable portion 154 of the secondary backing material 150. In these aspects, the first exposable portion 154 defines a portion of the first end edge 106 of the floor covering 100. In further aspects, the second portion 124 of the primary backing component 116 can be selectively moveable relative to the first portion 122 of the primary backing component 116 to a position in which at least a portion of the second portion 124 of the primary backing component 116 is vertically spaced from the first exposable portion 154 of the secondary backing material 150.

In exemplary aspects, the secondary backing material 150 can comprise a textured bottom surface. Optionally, in these aspects, the textured bottom surface can define a structure that is configured to create a coefficient of friction sufficient to permit use of the disclosed floor coverings in desired applications, including, for example and without limitation, synthetic turf applications (e.g., athletic fields). Optionally, the textured bottom surface can comprise a plurality of protrusions or projections that are configured to create such a coefficient of friction. In further aspects, it is contemplated that the textured bottom surface can be configured to be skid-resistant and/or slip-resistant for a particular application, factoring in the specific material of the textured bottom surface and the material upon which the textured bottom surface will rest.

As further disclosed herein, in exemplary non-limiting aspects, it is contemplated that the secondary backing material can comprise a multi-layer secondary backing material. Suitable examples of such multi-layer secondary backing materials include textured scrim reinforced geomembranes, such as the DURA♦SKRIM® J25DT1 and J30DT1 materials manufactured by Raven Industries, Inc.

In exemplary aspects, the secondary backing material can comprise polypropylene, polyethylene terephthalate, polyethylene, or combinations thereof. Optionally, the secondary backing material can comprise polyethylene.

In exemplary aspects, the secondary backing material can comprise a woven material, a non-woven material, or a combination thereof.

Optionally, the secondary backing can comprise a woven material. In one aspect, the secondary backing can comprise a tape-tape yarn type backing, or a tape-spun yarn type backing. In certain aspects, the secondary backing is a tape-tape yarn woven material. In some aspects, the secondary backing comprises a polyolefin. In a yet further aspect, the polyolefin can comprise polypropylene. In certain exemplary aspects, the material for the secondary backing material can be a conventional material, for example and without limitation, a woven polypropylene fabric sold by Propex. Such exemplary secondary backings can also comprise a material that is a leno weave with polypropylene tape running in one direction and polypropylene spun yarn running in the other. In still other aspects, the secondary backing material used with the present invention is a woven polypropylene fabric with monofilaments running in both directions. A suitable example of such a material is manufactured by Shaw Industries, Inc. under the designation Style S8880.

In further aspects, the secondary backing material can be a material known as a fiber lock weave or "FLW." FLW is a fabric which includes fibers needle punched into it. It is contemplated that an FLW type fabric can also be used as a primary backing component, for example, in a floor covering with a relatively low pile height or weight.

In some aspects, the secondary backing can be a woven needle punched polypropylene fabric such as SoftBac® manufactured by Shaw Industries, Inc. In these aspects, this material has been enhanced by having about 1.5 ounce/sq. yard of polypropylene fibers or polyethylene terephthalate fibers needle punched onto one side of it and has a total basis weight of about 3.5 ounce/sq. yard. This needle punched fabric can be laminated so as to have the polypropylene fibers embedded within the adhesive backing layer. In still further aspects other materials can be used for the secondary backing, for example, and without limitation, if an integral pad is desired, a polyurethane foam or other cushion material can be laminated to the back side of the floor covering.

Optionally, the secondary backing can comprise a non-woven material. In certain aspects, the secondary backing can comprise a spunbond non-woven material. The spunbond backing can be produced by depositing extruded, spun filaments onto a collecting belt in a uniform random manner followed by bonding the fibers. The fibers can be separated during the web laying process by air jets or electrostatic charges. The collecting surface is usually perforated to prevent the air stream from deflecting and carrying the fibers in an uncontrolled manner. Bonding imparts strength and integrity to the web by applying heated rolls or hot needles to partially melt the polymer and fuse the fibers together. Since molecular orientation increases the melting point, fibers that are not highly drawn can be used as thermal binding fibers. In some aspect, the spun-bond secondary backing component can comprise a bi-component filament of a sheath-core type. In some aspects, the polymeric core component can have a higher melting point than the polymeric sheath component. In some aspects, the polymeric core component can comprise polyester, aliphatic polyamides, polyphenylene oxide and/or co-polymers or blends thereof. In yet other aspects, the polyester can comprise polyethylene terephthalate, polybutylene terephthalate, or polyparaphenylene terephthalamide. Optionally, in some aspects, the polymeric core can comprise polyethylene terephthalate. In further aspects, the sheath polymer can comprise a polyamide, polyethylene, or polyester. In yet further aspects, the sheath polymer can comprise nylon. In still further aspects, the sheath-core primary backing component can comprise a polyester as a core component and nylon as a sheath component. The exemplary sheath-core secondary backing component can be commercially available from Bonar. In yet other aspects, a polyester non-woven secondary backing can be commercially available from Freudenberg.

In some aspects, the secondary backing material can comprise a thermoplastic polyolefin. In certain aspects, the secondary backing material can comprise substantially linear ethylene polymers and homogeneously branched linear ethylene polymers (i.e., homogeneously branched ethylene polymers). Homogeneously branched ethylene polymers (including substantially linear ethylene polymers in particular) have low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra low density polyethylene (ULDPE).

In further aspects, when properly selected substantially linear ethylene polymers or homogeneously branched linear ethylene polymers are used as the secondary backing materials, the low flexural modulus of these polymers offers advantages in ease of floor covering installation and general floor covering handling. Substantially linear ethylene polymers, in particular, when employed as a secondary backing material show enhanced mechanical adhesion to polypropylene which improves the consolidation and delamination resistance of the various floor covering layers and components, i.e., polypropylene fibers, fiber bundles, the primary backing component. In some aspects, good abrasion resistance is especially important in commercial floor covering cleaning operations as good abrasion resistance generally improves floor covering durability.

In additional aspects, the secondary backing material can comprising a substantially linear ethylene polymer or homogeneously branched linear ethylene polymer can provide a substantial fluid and particle barrier which enhances the hygienic properties of floor covering. In further aspects, use of the secondary backing material comprising a substantially linear ethylene polymer or homogeneously branched linear ethylene polymer can allow totally recyclable floor covering products particularly where the floor covering comprises polypropylene fibers.

In some exemplary aspects, the secondary backing material can comprise a homogeneously branched ethylene polymer. The homogeneously branched ethylene polymer can have a single melting peak between −30° C. and 150° C., as determined using differential scanning calorimetry. In some aspects, the homogeneously branched ethylene polymer used in the secondary backing material of the disclosed invention, can be a substantially linear ethylene polymer characterized as having (a) a melt flow ratio, $I_{10}/I_2 > 5.63$; (b) a molecular weight distribution, $M_w/M_n$, as determined by gel permeation chromatography and defined by the equation: $(M_w/M_n) \leq (I_{10}/I_2) - 4.63$; (c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution and no long chain branching, and wherein the substantially linear ethylene polymer and the linear ethylene polymer are simultaneously ethylene homopolymers or interpolymers of ethylene and at least one $C_3$-$C_{20}$ α-olefin and have the same $I_2$ and $M_w/M_n$ and wherein the respective critical shear rates of the substantially linear ethylene polymer and the linear ethylene polymer are measured at the same melt temperature using a gas extrusion rheometer; and (d) a single differential scanning calorimetry, DSC, melting peak between −30° and 150° C.

In further aspects, the molecular weight distribution ($M_w/M_n$) for the substantially linear ethylene polymers and homogeneous linear ethylene polymers used in the present invention can generally range from about 1.8 to about 2.8. Substantially linear ethylene polymers are known to have excellent processability, despite having a relatively narrow molecular weight distribution. Unlike homogeneously and heterogeneously branched linear ethylene polymers, the melt flow ratio ($I_{10}/I_2$) of substantially linear ethylene polymers can be varied essentially independently of their molecular weight distribution, $M_w/M_n$.

In some aspects, the secondary backing material comprising homogeneously branched ethylene polymers can include interpolymers of ethylene and at least one α-olefin prepared by a solution, gas phase, or slurry polymerization process, or combinations thereof. In some aspects the α-olefins are represented by the following formula:

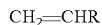

where R is a hydrocarbyl radical. Further, R can be a hydro-carbyl radical having from one to twenty carbon atoms and as such the formula includes $C_3$-$C_{20}$ α-olefins. In other aspects, α-olefins for use as comonomers include propylene, 1-butene, 1-isobutylene, 1-pentene, 1-hexene, 4-methyl-1-pentene, 1-heptene and 1-octene, as well as other comonomer types such as styrene, halo- or alkyl-substituted styrenes, tetrafluoro-ethylene, vinyl benzocyclobutene, 1,4-hexadiene, 1,7-octadiene, and cycloalkenes, e.g., cyclopentene, cyclo-hexene and cyclooctene. In certain aspects, the comonomer will be 1-butene, 1-pentene, 4-methyl-1-pentene, 1-hexene, 1-heptene, 1-octene, or mixtures thereof, as secondary backing materials comprised of higher α-olefins will have especially improved toughness. In yet other aspects, the comonomer can be 1-octene and the ethylene polymer can be prepared in a solution process.

In certain aspects, the density of the substantially linear ethylene polymer or homogeneously branched linear ethylene polymer, as measured in accordance with ASTM D-792, does not exceed about 0.92 g/cc, and is generally in the range from about 0.85 g/cc to about 0.92 g/cc, from about 0.86 g/cc to about 0.91 g/cc, and from about 0.86 g/cc to about 0.90 g/cc.

In yet further aspects, the molecular weight of the homogeneously branched linear ethylene polymer or substantially linear ethylene polymer can be characterized using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the homogeneously branched linear ethylene polymer or substantially linear ethylene polymer is generally from about 1 grams/10 minutes (g/10 min) to about 500 g/10 min, about 2 g/10 min to about 300 g/10 min, from about 5 g/10 min to about 100 g/10 min, from about 10 g/10 min to about 50 g/10 min, and about 25 to about 35 g/10 min.

In some other aspects, an additional measurement can be useful in characterizing the molecular weight of the homogeneous linear ethylene polymer or the substantially linear ethylene polymer and can be performed using a melt index measurement according to ASTM D-1238, Condition 190° C./10 kg (formerly known as "Condition (N)" and also known as $I_{10}$). The ratio of the ho and the $I_2$ melt index terms is the melt flow ratio and is designated as $I_{10}/I_2$. For the substantially linear ethylene polymer, the $I_{10}/I_2$ ratio indicates the degree of long chain branching, i.e., the higher the $I_{10}/I_2$ ratio, the more long chain branching in the polymer. The $I_{10}/I_2$ ratio of the substantially linear ethylene polymer is at least about 6.5, at least about 7, or at least about 8. The $I_{10}/I_2$ ratio of the homogeneously branched linear ethylene polymer is generally less than about 6.3.

In some aspects, the ethylene polymers can have a relative low modulus. That is, the ethylene polymer can be characterized as having a 2% secant modulus less than about 24,000 psi (163.3 MPa), less than about 19,000 psi (129.3 MPa), and less than about 14,000 psi (95.2 MPa), as measured in accordance with ASTM D790.

In certain aspects, the ethylene polymers described herein can be substantially amorphous or totally amorphous. That is, the ethylene polymer can be characterized as having a percent crystallinity less than about 40 percent, less than about 30 percent, more less than about 20, and less than about 10 percent, as measured by differential scanning calorimetry using the equation:

percent crystallinity %=$(H_f/292) \times 100$, where $H_f$ is the heat of fusion in Joules/gram.

In other aspects, the homogeneously branched ethylene polymer (HBEP) can be used alone or can be blended or mixed with one or more synthetic or natural polymeric material. In some aspects, the polymers for blending or mixing with homogeneously branched ethylene polymers used in the present invention include, but are not limited to, another homogeneously branched ethylene polymer, low density polyethylene, heterogeneously branched LLDPE, heterogeneously branched ULDPE, medium density polyethylene, high density polyethylene, grafted polyethylene (e.g. a maleic anhydride extrusion grafted heterogeneously branched linear low polyethylene or a maleic anhydride extrusion grafted homogeneously branched ultra low density polyethylene), ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, and vulcanates.

In further aspects, the secondary backing material can comprise a blend of at least two polyethylenes, wherein the polyethylene can comprise a homogeneously branched ethylene polymer (HBEP) or a substantially linear ethylene polymer (SLEP), or mixtures thereof. In other aspects, the secondary backing material can comprise a blend of at least three or four, or more polyethylenes, wherein the polyethylenes comprise a homogeneously branched ethylene polymer (HBEP) or a substantially linear ethylene polymer (SLEP), or mixtures thereof. Still further, the secondary backing material can comprise a polyethylene comprising at least about 80% by weight of at least one (or two or more) HBEP or SLEP as measured by weight of the polyethylene, including exemplary values of about 85, 90, 95, 97, 98, or about 99% by weight of the polyethylene, where any value can comprise an upper or a lower endpoint, as appropriate.

In the aspects, where the blend of at least two (or three or more) polyethylenes is used, the amount of each polyethylene can be individually varied in the amounts of, for example, from about 1, 5, 10, 15, 20, 25, 30, 35, 40, 45, 50, 55, 60, 65, 70, 75, 80, 85, 90, 95, 97 or about 98% by weight of the total blend, where any value can be used for the individual components, and any value can be used as an upper or a lower endpoint, as appropriate.

The density of the polyethylene components in the blend can be from about 0.860, 0.870, 0.880, 0.885, 0.890, 0.895, 0.900, 0.905, or about 0.910 g/cc, where any value can comprise an upper or a lower endpoint, as appropriate.

The actual blending or mixing of various polymers can be conveniently accomplished by any technique known in the art including, but not limited to, melt extrusion compounding, dry blending, roll milling, melt mixing such as in a Banbury mixer and multiple reactor polymerization. In some aspects, the blends or mixtures can include a homogeneously branched ethylene polymer and a heterogeneously branched ethylene α-olefin interpolymer, wherein the α-olefin is a $C_3$-$C_8$ α-olefin prepared using two reactors operated in parallel or in series with different catalyst systems employed in each reactor. Multiple reactor polymerizations are described in copending applications U.S. Ser. No. 08/544,497, filed Oct. 18, 1995 and U.S. Ser. No. 08/327,156, filed Oct. 21, 1994, the disclosures of all three of which are incorporated herein by reference. In some aspects, multiple reactor polymerizations comprise non-adiabatic solution loop reactors as described in provisional applications U.S. Ser. No. 60/014,696 and U.S. Ser. No. 60/014,705, both filed Apr. 1, 1996, the disclosures of all of which are incorporated herein by reference.

In another aspect, the secondary backing material can comprise a modified homogeneously branched ethylene polymer. In particular, in certain aspects of the invention the at least one homogeneously branched ethylene polymer that can be present within the secondary backing material can be modified by the addition of at least one adhesive polymeric additive. Suitable adhesive polymeric additives include, for example and without limitation, polymer products comprised of (1) one or more ethylenically unsaturated carboxylic acids, anhydrides, alkyl esters and half esters, e.g., acrylic acid, methacrylic acid, maleic acid, maleic anhydride, itaconic acid, fumaric acid, crotonic acid and citraconic acid, citraconic anhydride, succinnic acid, succinnic anhydride, methyl hydrogen maleate, and ethyl hydrogen maleate; esters of ethylenically unsaturated carboxylic acids, e.g., ethyl acrylate, methyl methacrylate, ethyl methacrylate, methyl acrylate, isobutyl acrylate, and methyl fumarate; unsaturated esters of carboxylic acids, e.g., vinyl acetate, vinyl propionate, and vinyl benzoate; and ethylenically unsaturated amides and nitriles e.g., acrylamide, acrylonitrile, methacrylonitrile and fumaronitrile; and (2) one or more ethylenically unsaturated hydrocarbon monomers such as aliphatic α-olefin monomers, e.g., ethylene, propylene, butene-1 and isobutene; conjugated dienes, e.g., butadiene and isoprene; and monovinylidene aromatic carbocyclic monomers, e.g., styrene, α-methylstyrene, toluene, and t-butylstyrene.

A modified homogeneously branched ethylene polymer for use in the secondary backing materials can be conveniently prepared by known techniques such as, for example, by interpolymerization or by a polymerization procedure followed by a chemical or extrusion grafting procedure. Suitable grafting techniques are described in U.S. Pat. Nos. 4,762,890; 4,927,888; 4,230,830; 3,873,643; and 3,882,194, the disclosures of all of which are incorporated herein by reference.

In some aspects, the adhesive polymeric additives for use in the present invention can include maleic anhydride grafts wherein maleic anhydride is grafted onto an ethylene polymer at a concentration of about 0.1 to about 5.0 weight percent, about 0.5 to about 1.5 weight percent. The presence of ethylene polymer/maleic anhydride grafts as adhesive polymeric additives in the present invention can improve the performance and operating window of extrusion coated homogeneously branched ethylene polymers as the secondary backing material, especially when used in connection with polar polymers such as for example, but is not limited to, nylon and polyester faced floor coverings. The improvement pertained to substantially higher comparative abrasion resistance and tuft bind strength. In an exemplary aspect, a composition for forming a maleic anhydride graft is the Amplify® GR 204 available from Dow Chemicals.

In further aspects, the ethylene polymers for use as the grafted host polymer include low density polyethylene (LDPE), high density polyethylene (HDPE), heterogeneously branched linear low density polyethylene (LLDPE), homogeneously branched linear ethylene polymers and substantially linear ethylene polymers. In some aspects, the host ethylene polymers have a polymer density greater than or equal to about 0.86 g/cc, 0.87 g/cc, 0.88 g/cc, 0.89 g/cc, 0.90 g/cc, 0.91 g/cc, 0.92 g/cc, 0.93 g/cc, or greater than or equal to about 0.94 g/cc. In yet other aspects, the substantially linear ethylene polymers and high density polyethylene are utilized as host ethylene polymers.

In some aspects, it is contemplated that the secondary backing material to be extruded or applied by any other technique known in the art. In some aspects, the secondary backing material of this invention may optionally include exemplary additives such as foaming agents, pH controllers, flame retardants, fillers, tackifiers, wetting agents, dispersing agents, anti-microbial agents, lubricants, dyes, anti-oxidants, and the like, which are well known to those skilled in the art, without loss of the characteristic properties.

In one aspect, the secondary backing material can further comprise one or more flame retardants sufficient to ensure the floor covering structure satisfies the requirements of the radiant flux floor covering test according to the ASTM-E648 testing procedures. In particular, according to certain aspects, the floor covering of the present invention exhibit a Class 1 critical radiant flux of greater than 0.45 watts per $cm^2$ as measured according to ASTM-E648. According to other aspects of the invention, the floor covering described herein can exhibit a Class 2 critical radiant flux in the range of from 0.22 to 0.44 watts per $cm^2$ as measured according to ASTM-E648. In still further aspects, the floor covering of the present invention can exhibit an unclassifiable critical radiant flux of less than 0.22 watts per $cm^2$ as measured according to ASTM-E648.

Exemplary flame retardants that can be incorporated into the secondary backing materials of the present invention include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resourcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the secondary backing material of the instant invention and the selection of such amount will depend, in part, upon the particular flame retardant used and desired floor covering applications. Such amounts can be readily determined through no more than routine experimentation.

Exemplary and non-limiting fillers that can be incorporated into the secondary backing materials of the present invention can include calcium carbonate, fly-ash, recycled calcium carbonate, aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof. In one aspect, the secondary backing material comprises inorganic filler with high heat content. In some aspects, it is for the filler to exhibit relatively high heat content. Examples of such fillers include, but are not limited to, calcium carbonate, aluminum trihydrate, talc, and barite. The exemplified high heat content fillers allow the extrudate to remain at elevated temperatures longer with the beneficial result of providing enhanced encapsulation and penetration. In this aspect, the high heat content fillers should be ground or precipitated to a size that can be conveniently incorporated in an extrusion coating melt stream. Exemplary non-limiting particle sizes for the inorganic filler material can include particle sizes in the range of from about 1 to about 50 microns. Still further, it should also be understood that the filler component can be present in any desired amount. However, in an exemplary aspect, the filler is present in an amount in the range of from about 10 weight % to about 90 weight %, based upon the total weight of the secondary backing material, including exemplary amounts of about 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, and about 85 weight %. Still further, the amount of filler present can be in any range derived from any two of the above stated weight percentages.

In still another aspect, the secondary backing material can further comprise one or more tackifying additives. The tackifier can for example be tall oil or rosin based or, alternatively, can be an aliphatic or aliphatic aromatic hydrocarbon blend resin. As the tackifier is an optional component, the amount of tackifier can be, when present, in the range of from greater than 0 weight percent up to and even exceeding about 50 weight % of the secondary backing material. For example, in one aspect, the amount of tackifier can be in the range of from about 5 weight % to about 45 weight %. In still another aspect, the amount of tackifier can be in the range of from about 10 weight % to about 20 weight %.

As further disclosed herein, the floor covering can comprise a polymer film. In exemplary aspects, the polymer film can be applied to a surface of the secondary backing material. Optionally, the polymer film can be laminated to the secondary backing material. Optionally, the polymer film can be applied to a surface of a second secondary backing material, or laminated to the second secondary backing material. Alternatively, the polymer film can be applied directly to the second surface of the adhesive layer.

In some exemplary aspects, the polymer film can comprise a thermoplastic material. Optionally, the polymer film can be a thermoplastic film. In further aspects, the polymer film can comprise polymers and copolymers of polyethylene, polypropylene, polyurethane, polyester, polyvinylchloride, nylon and polyethylene vinyl acetate. Optionally, the polymer film can comprise polyethylene, polypropylene, polyurethane, polyester, or polyvinylchloride, or a combination thereof. Optionally, the polymer film can be polyethylene. In further aspects, the polymer film can be a combination of polyethylene and polyester.

In further aspects, the polymer film can be an extruded film. In other aspects, the polymer film can be a blown film. In further aspects, the polymer film can be a cast film. In still further aspects, the polymer film can be an engineered film. The term "engineered film" as used herein refers to a polymer film comprising same or different polymers and copolymers, wherein the film can be formed by various techniques to ensure desirable properties. In some aspects, the engineered film can be a reinforced film. In further aspects, and without limitation, the engineered reinforced film can comprise a plurality of layers of the same or different polymer or copolymer. In other aspects, the engineered film can comprise layers of polyethylene film sandwiched with a layer of polyester. In yet further aspects, the engineered film can comprise layers of polyethylene and polypropylene, or layers of polyethylene and chemically resistant ethylene vinyl alcohol (EVOH) copolymer. In certain aspects, the engineered film used in the current disclosure can be purchased from Raven Industries.

In still further aspects, the polymer film can be a composite film. The composite film can comprise polyethylene and polypropylene. The polymer film can comprise a polypropylene core. Optionally, it is contemplated that the polymer composite film can comprise at least two layers. Alternatively, in other aspects, the polymer composite film can comprise at least three layers. It is understood that each layer of the polymer composite film can be the same or different and can comprise any of the polymers listed above. In some aspects, the composite film can comprise at least three layers, and each outer layer of the composite film can comprise polyethylene.

In exemplary aspects, the polymer film disclosed herein can act as a fluid barrier. In these aspects, the polymer film can be fluid impermeable. In one aspect, the polymer film can be impermeable to aqueous fluids. In another aspect, the polymer film can be impermeable to non-aqueous fluids. In this aspect, the non-aqueous fluid can be an organic fluid. In further exemplary aspects, the polymer film can be impermeable to water, carbonate and non-carbonate beverages, juices, milk, wine, or any other alcohol substances, human or pet bodily fluids, food fluids, food processing fluids, rain, or snow.

In further exemplary aspects, the polymer film can be impermeable to gases. For example and without limitation, the polymer film can be impermeable to volatile organic compounds (VOCs), methane, carbon dioxide, carbon oxide, radon, gasoline, benzene and the like. In further aspects, the polymer film can be impermeable to the vapors. Optionally, in some exemplary aspects, the polymer film can be a semipermeable material. In these aspects, the polymer film can be semipermeable to gases. In further aspects, the polymer film can be semipermeable to all atmospheric gases. For example and without limitation, the polymer film can be semipermeable to oxygen, hydrogen, carbon dioxide, carbon oxide, nitrogen, and the like.

As disclosed herein, in some aspects, the polymer film can have a thickness of less than about 6 mils. In other aspects, the polymer film can have a thickness of exemplary values of about 5.5 mils, about 5 mils, about 4.5 mils, about 4 mils, about 3.5 mils, about 3 mils, about 2.5 mils, about 2 mils, about 1.5 mils, about 1 mil, and about 0.5 mils. In other aspects, the polymer film can have a thickness in any range derived from any two of the above stated values. For example and without limitation, the polymer film can have a thickness from about 1 mil to about 5.5 mils, or from about 2 mils to about 4 mils, or from about 1 mil to about 3.5 mils.

In other aspects, the polymer film can have a thickness of greater than about 10 mils. For example and without limitation, the polymer film can have a thickness of exemplary values of about 10 mils, about 15 mils, about 20 mils, about 25 mils, about 30 mils, about 35 mils, about 40 mils, about 45 mils, about 50 mils, about 55 mil, about 60 mils, about 65 mils, about 70 mils, about 75 mils, about 80 mils, about 85 mils, about 90 mils, and about 100 mils. It is contemplated that the polymer film can have a thickness in any range derived from any two of the above stated values. For example and without limitation, the polymer film can have thickness from about 10 mils to about 40 mils, or from about 30 mils to about 50 mils, or from about 30 mil to about 80 mils.

In some aspects, the polymer film can be continuous. In further aspects, the polymer film can be substantially free of perforations or pinholes. Optionally, the polymer film can be continuous and substantially free of perforations.

In exemplary aspects, the floor covering 100 disclosed herein can be a carpet tile, a broadloom carpet, an area rug, or a synthetic turf floor covering.

B. Synthetic Turf Floor Coverings

As described herein, in some exemplary aspects, the floor covering 100 can be a synthetic turf floor covering. In these exemplary aspects, the plurality of fibers 128 of the greige good 114 can be synthetic turf fibers. For example and without limitation, the floor covering 100 can be a turf floor covering, and the plurality of fibers 128 of the turf floor covering can be synthetic turf fibers.

In further exemplary aspects, the synthetic turf can have a primary backing layer and a plurality of rows of individual tufts tufted into the backing layer. Each tuft can comprise at least one yarn per tuft. It is contemplated that each one of the at least one yarn can vary from the others in at least one of material, color, texture, tuft denier, denier per filament, cross-section and the like. Alternatively, each one of the at least one yarn can be the same in material, color, texture, tuft denier, denier per filament, cross-section and the like. Additionally, in some exemplary aspects, the synthetic turf can be unfilled or uninstalled synthetic turf.

In other exemplary aspects, one of the at least one yarns can comprise a wrap yarn or a bulk continuous fiber (BCF) yarn. Use of a BCF fiber, as contemplated herein can avoid the expense of twisting by utilizing a wrap yarn to hold multiple filaments together. (However, one skilled in the art will appreciate that use of twisting is also contemplated within the scope of the present disclosure.) In one aspect, the wrap yarn can comprise one of a low-bulk, low temperature-shrinkage fiber; a medium-bulk, low temperature-shrinkage fiber; and a high-bulk, low temperature shrinkage fiber that is configured to shrink down to a selected pile level during the tufting and coating process or subsequent heat treatment. As one skilled in the art will appreciate, having additional BCF yarn incorporated into each tuft can enable a greater degree of bundle wrap by the coating. In one example, tuft bind increases of from about 10% to about 20% have been observed due to use of BCF yarn as described above. In one exemplary aspect, yarns having identical cross-sections can be selected to differ in their shrinkage rates such that the resultant finished turf comprises tufts having small, medium and large blades. One skilled in the art will appreciate the range of possible combinations of different yarn characteristics that can be achieved herein.

In other exemplary aspects, at least one texturized yarn thread can be utilized in the tuft. It is contemplated that texturized yarn can trap infill and can desirably reduce infill migration during athletic or other activity. Additionally, it is further contemplated that evenly distributing the texturized yarn can maximize the benefit of reduced migration.

In other exemplary aspects, at least one slit tape yarn can be employed in the tuft and, in a further aspect, the slit tape yarn can be configured to fold over on the surface. As used herein, the term slit tape yarn comprises, for example and without limitation, conventional slit tape yarn, monofilament slit tape yarn and the like. It is contemplated that the slit tape yarn can reduce the tendency of rubber infill to splash when the surface of the synthetic turf is impacted by, for example, a ball, a player or the like. As with texturized yarn, it is contemplated that even distribution of the slit tape yarn will maximize the benefit of splash reduction.

In other exemplary aspects, at least one monofilament yarn can be employed in the tuft. It is further contemplated that adjusting or controlling the rigidity of the fibers can selectively control the roll of a ball on the surface of the resultant synthetic turf. As the stiffness or rigidity of the monofilament yarn increases, the fibers exhibit increased resistance to the ball and vice-versa. Accordingly, is contemplated to select a monofilament yarn appropriate to control the roll of a ball according to end use requirements. In a further aspect, it is contemplated that a more even distribution of the monofilament yarns can ensure a ball will roll evenly in all directions and that even distribution of monofilament yarns of a selected rigidity or stiffness can provide uniform ball roll control.

In other exemplary aspects, the synthetic turf can comprise an infill material disposed on a top surface of the primary backing layer an in between the tufts. The infill material can comprise any known infill material such as, for example and without limitation, rubber particles, sand, natural materials and the like.

In other exemplary aspects, each yarn can comprise any cross-section known in the art and, in certain aspects, each yarn can comprise a cross-section of at least one of a diamond, a rectangle, a serrated diamond, an oval or otherwise round cross section, a spine, a celery, a serrated celery, a tri-lobal, a winged tri-lobal and the like. In another aspect, at least one yarn of the at least one yarns can comprise cross-sections disclosed in U.S. patent application Ser. No. 13/951,133 entitled "Yarn Filament for Synthetic Turf and Method for Making the Same and filed on Jul. 25, 2013, and U.S. patent application Ser. No. 13/922,967 entitled "Yarn Filament and Method for Making the Same and filed on Jun. 20, 2013, both of which are hereby incorporated by reference in their respective entireties.

In other exemplary aspects, each yarn can comprise a material selected from the group comprising LDPE, MDPE, Nylon, PP, PET, PLA and co-extruded biomaterials thereof.

In other exemplary aspects, a given tufted row of the plurality of tufted rows is substantially similar to each adjacent tufted row and, in a further aspect, adjacent tufts on a given row are spaced apart at a predetermined gauge. A synthetic turf having a plurality of tufted rows substantially similar to each adjacent row can allow a turf installer to cut and install the turf without regard to matching tufted rows. One skilled in the art will appreciate that eliminating the need to match tufted rows can decrease the cost of turf installation by up to about 40%.

C. Floor Covering Systems

Figure 3:
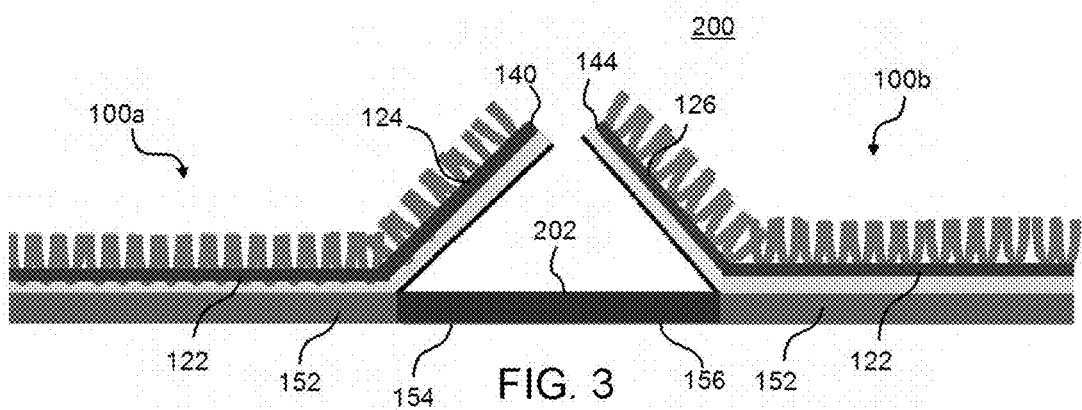
FIG. 3 shows a cross-sectional side view of an exemplary floor covering system including two floor coverings positioned adjacent to one another, with exposed portions of the secondary backing materials overlapping one another.

Referring to FIG. 3, it is contemplated that the floor covering 100 disclosed herein can be used in a floor covering system 200 comprising a plurality of floor coverings 100. In exemplary aspects, the floor covering system 200 can comprise at least a first and a second floor covering 100a, 100b as described herein. In these exemplary aspects, the first exposable portion 154 of the secondary backing material 150 of the first floor covering 100a can overlie and be welded to the second exposable portion 156 of the secondary backing material 150 of the second floor covering 100b, thereby forming a continuous, impermeable barrier 202. In further aspects, no fibers of the plurality of fibers 128 are situated between the first exposable portion 154 of the secondary backing material 150 of the first floor covering 100a and the second exposable portion 156 of the secondary backing material 150 of the second floor covering 100b. In these aspects, the moveable body 140 of the first floor covering 100a can be positioned adjacent to the moveable body 144 of the second floor covering 100b. Optionally, in some aspects, the moveable body 140 of the first floor covering 100a can overlie and be secured to the moveable body 144 of the second floor covering 100b. Alternatively, in other aspects, the moveable body 144 of the second floor covering 100b can overlie and be secured to the moveable body 140 of the first floor covering 100a. It is contemplated that the floor covering systems 200 disclosed herein can comprise adjacent first and second floor coverings 100 that are capable of being welded together such that the pile direction across the adjacent first and second floor coverings is consistent. In exemplary aspects, each floor covering 100 of the floor covering system 200 can be capable of functioning independently as a floor covering, and the floor covering system comprises a plurality of smaller floor coverings that cooperate to define a larger floor covering.

D. Method of Making Floor Coverings

Also disclosed is a method of making the floor covering described herein. In exemplary aspects, the adhesive layer can be applied onto a back surface of the primary backing component of at least one greige good. It is contemplated that the method of making a floor covering can comprise extruding the adhesive composition onto the back surface of the primary backing component of the at least one greige good. In further aspects, an attached portion of the secondary backing material can be laminated onto the adhesive layer of a first portion of the primary backing component of the at least one greige good. In these aspects, an exposable portion of the secondary backing material can be unattached to a second portion of the primary backing component that adjoins the first portion of the primary backing component and at least partially overlies the exposable portion of the secondary backing material. It is contemplated that the exposable portion of the secondary backing material can define a portion of an edge of the floor covering.

As further described herein, the second portion of the primary backing component can be pivotally moveable between a closed position and an open position relative to a pivot axis defined at the intersection between the first and second portions of the primary backing component. Such pivoting capabilities can permit access to the second portion of the primary backing component such that the second portion of the primary backing component can be sealed, as further described herein, thereby creating a barrier between the primary backing component and the exposable portion of the secondary backing material. In these aspects, the second portion of the primary backing component can be pivoted from the closed position to the open position to expose at least a portion of the exposable portion of the secondary backing material. While the second portion of the primary backing component is in the open position, a sealing material can be applied to the second portion of the primary backing component by contact with the second surface of the portion of the adhesive layer applied to the second portion of the primary backing component. Application of the sealing material to the second portion of the primary backing component can form a barrier between the second portion of the primary backing component and the exposable portion of the secondary backing material when the second portion of the primary backing component is in the closed position. Following application of the sealing material to the second portion of the primary backing component, the second portion of the primary backing component can be moved from the open position to the closed position.

Figure 4:
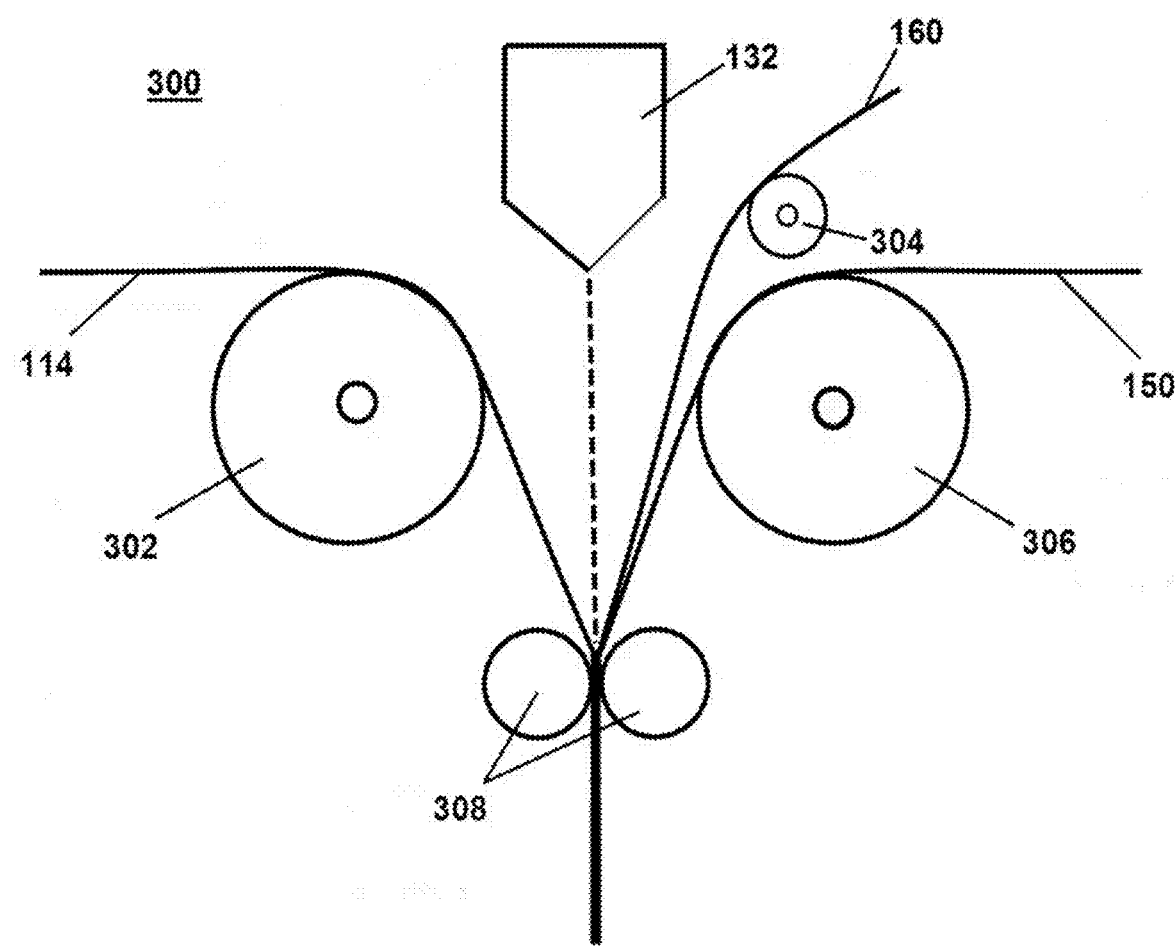
FIG. 4 shows a schematic illustration of an exemplary system and method for making a floor covering as disclosed herein.

FIG. 4 shows an exemplary line 300 for making a floor covering 100 shown in FIGS. 1-2. As shown in FIG. 4, a greige good 114 made by attaching a plurality of fibers to the primary backing component 116 and extending from the face surface 118 of the primary backing component 116 are provided by roll 302, wherein the back surface 120 of the primary backing component 116 is facing up. The disclosed adhesive layer 132 is applied to the back surface 120 of the first and second portions 122, 124 of the primary backing component 116, or a precoat layer 130, if present. The first portion 122 of the primary backing component 116 is ultimately positioned in contact with the attached portion 152 of the secondary backing material 150, and the second portion 124 of the primary backing component 116 is ultimately positioned in contact with the sealing material 160. In this exemplary line, the disclosed sealing material 160 is directed from roll 304, and the disclosed secondary backing 150 is directed from roll 306. It is contemplated that rotation of roll 304 can be paused, either manually or automatically, while rotation of rolls 302 and 306 continue such that the sealing material 160 is only applied to the second portion 124 of the primary backing component 116. The greige good 114 (with or without the precoat layer), the adhesive layer 132, the sealing material 160, and the secondary backing material 150 are passed between a set of nip rolls (or pinch rolls) 308 to laminate the attached portion of the secondary backing material 150 and the sealing material 160 to respective portions of the first and second portions 122, 124 of the primary backing components 116, as described herein.

The adhesive composition can be provided by any means known to one of ordinary skills in the art, including, but not limited to, a dispensing apparatus, an extrusion station, a sprayer for a liquefied adhesive composition, or a lick roll rotating with a pan, which contains the liquefied adhesive composition. Nip rollers 308, may be heated by any means that are known to those having ordinary skill in the art to which the invention relates.

E. Method of Installing

Further disclosed herein, and with reference to FIGS. 5A-5E, are methods of installing the described floor coverings. In exemplary aspects, the method of installing can comprise laying down a first floor covering as described herein on a subfloor. In these aspects, the first floor covering can comprise a secondary backing material having an attached portion and an exposable portion. As further disclosed herein, the attached portion of the secondary backing material can be adhered to a first portion of a primary backing component by contact with an adhesive layer. A moveable body comprising a second portion of the primary backing component and the portion of the adhesive layer applied to the second portion of the primary backing component can adjoin the first portion of the primary backing component of the first floor covering and can be unattached from the secondary backing material of the first floor covering. In these aspects, the moveable body at least partially can overlie the exposable portion of the secondary backing material of the first floor covering. The exposable portion of the secondary backing material can define a portion of a first edge of the first floor covering.

In further aspects, a second floor covering comprising a secondary backing material having an attached portion and an exposable portion can be laid down on the subfloor adjacent to the first floor covering. As with the first floor covering, the attached portion can be adhered to a first portion of a primary backing component by contact with an adhesive layer. A moveable body comprising a second portion of the primary backing component and the portion of the adhesive layer applied to the second portion of the primary backing component can adjoin the first portion of the primary backing component of the second floor covering and can be unattached from the secondary backing material of the second floor covering. The moveable body can at least partially overlie the exposable portion of the secondary backing material of the second floor covering. The exposable portion of the secondary backing material can define a portion of a first edge of the second floor covering.

Figure 5A:
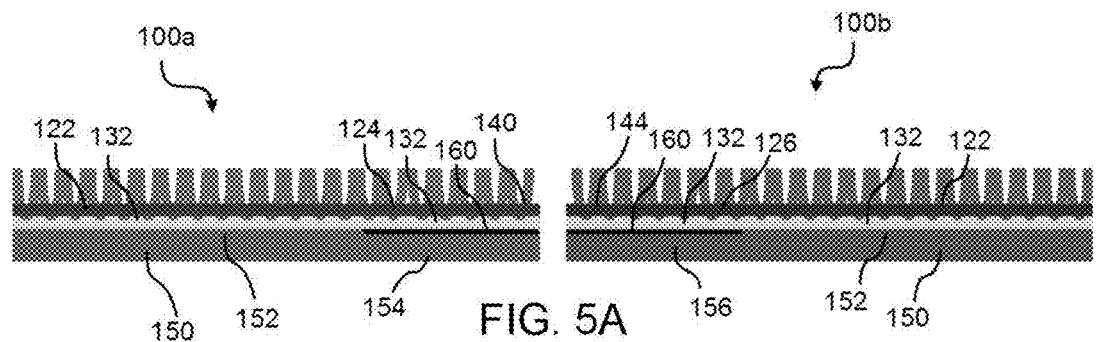
FIGS. 5A-5E show the sequential positioning and installation of an exemplary floor covering system 200 as disclosed herein.
Figure 5B:
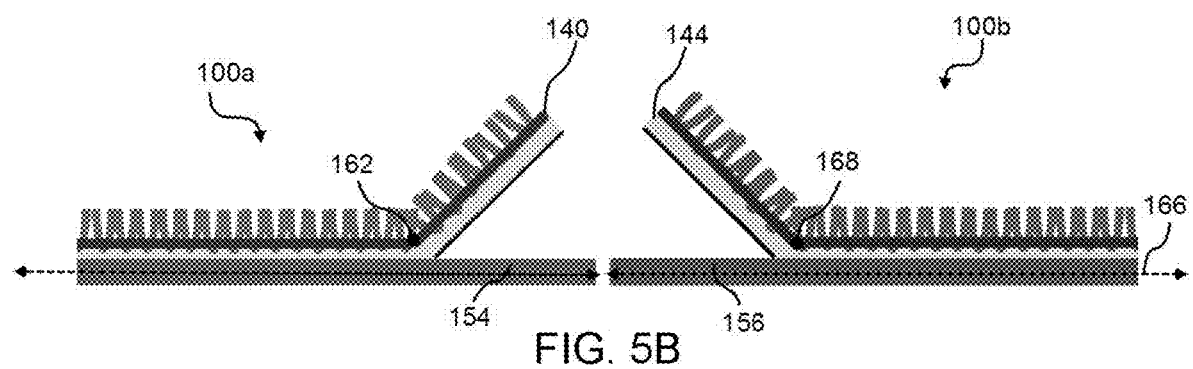

In further exemplary aspects, the moveable body of each of the first and second floor coverings can be pivotally moveable between a closed position and an open position relative to a pivot axis defined at the intersection between the first and second portions of the primary backing components of each respective floor covering. In these aspects, as shown in FIGS. 5A-5B, the moveable bodies can be pivoted from the closed position to the open position to permit overlapping of the exposable portions of the secondary backing materials of the first and second floor coverings. FIG. 5A shows the first and second floor coverings positioned adjacent to one another, with the moveable bodies situated in the closed position. Prior to overlapping of the exposable portions of the secondary backing materials, the moveable bodies of the first and second floor coverings can be moved to the open position, as shown in FIG. 5B. Each floor covering of the first and second floor coverings can comprise a plurality of fibers attached to the primary backing component and extending from a face surface of the primary backing component. In these aspects, it is contemplated that no fibers of the plurality of fibers of the first and second floor coverings are situated within the overlapped edge region between the exposable portions of the secondary backing materials of the first and second floor coverings.

Figure 5C:
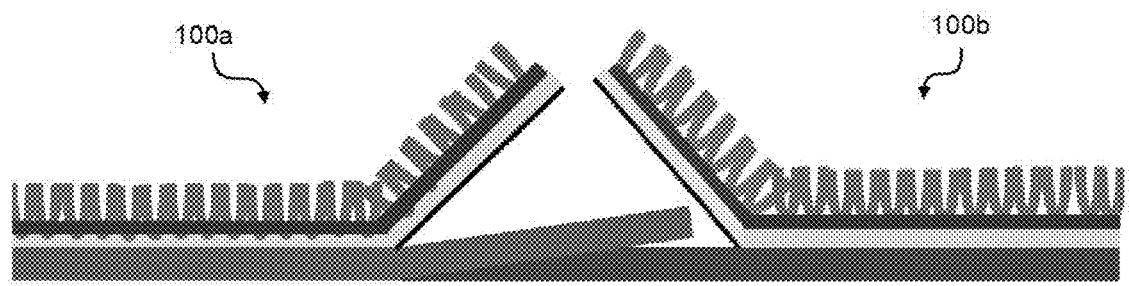
Figure 5D:
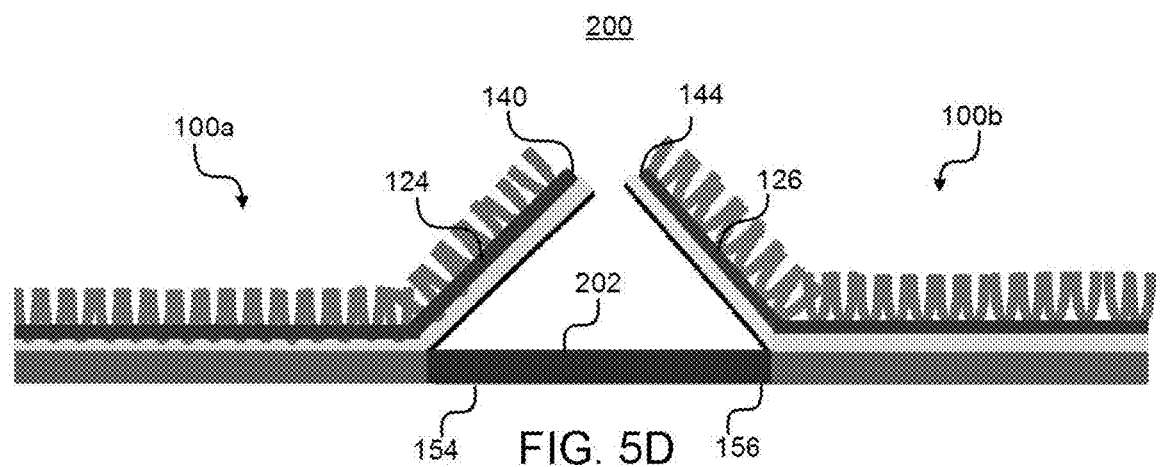

As shown in FIG. 5C, the exposable portion of the secondary backing material of the first floor covering can be overlapped with the exposable portion of the secondary backing material of the second floor covering to form an overlapped edge region. Then, the overlapped region of the first and second floor coverings can be welded together, as shown in FIG. 5D, using conventional methods. To weld the exposable portions of the secondary backing materials of the first and second floor coverings together, heat can be applied to the overlapped edge region of the first floor covering and the second floor covering.

In exemplary aspects, the step of applying heat can comprise applying heat and compressive force at the same time to bond the exposable portion of the secondary backing material of the first floor covering to the exposable portion of the secondary backing material of the second floor covering. In further aspects, the step of applying heat can be accomplished by rolling a heat welder apparatus over the overlapped edge region and operating the heat welder apparatus while the head welder apparatus is rolled over the overlapped edge region. As will be appreciated by one skilled in the art, any known conventional heat welder apparatus can be used to accomplish the step of applying heat to the overlapped region during the manufacture and/or installation processes. For example and without limitation, a wheeled seam welder can be used. The exemplary seam welder can also include a cabinet and a hot air blower, typically powered by electricity through an electrical cord. The electrical cord can connect the internal circuitry in the cabinet with the hot air blower. A power cord can connect the internal circuitry with a source of electric power. It is contemplated that this source of electric power can be a portable electric generator. An adjustable upright T-handle can provide a convenient means for guiding the seam welder. Various controls (such as for surface speed, air temperature, etc.) can be provided on the face of the cabinet.

Figure 5E:
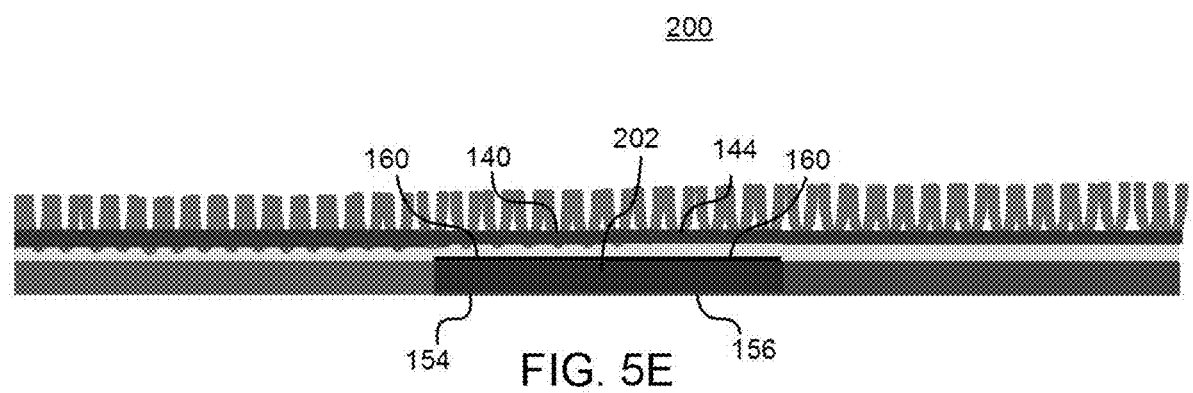
Figure 6:
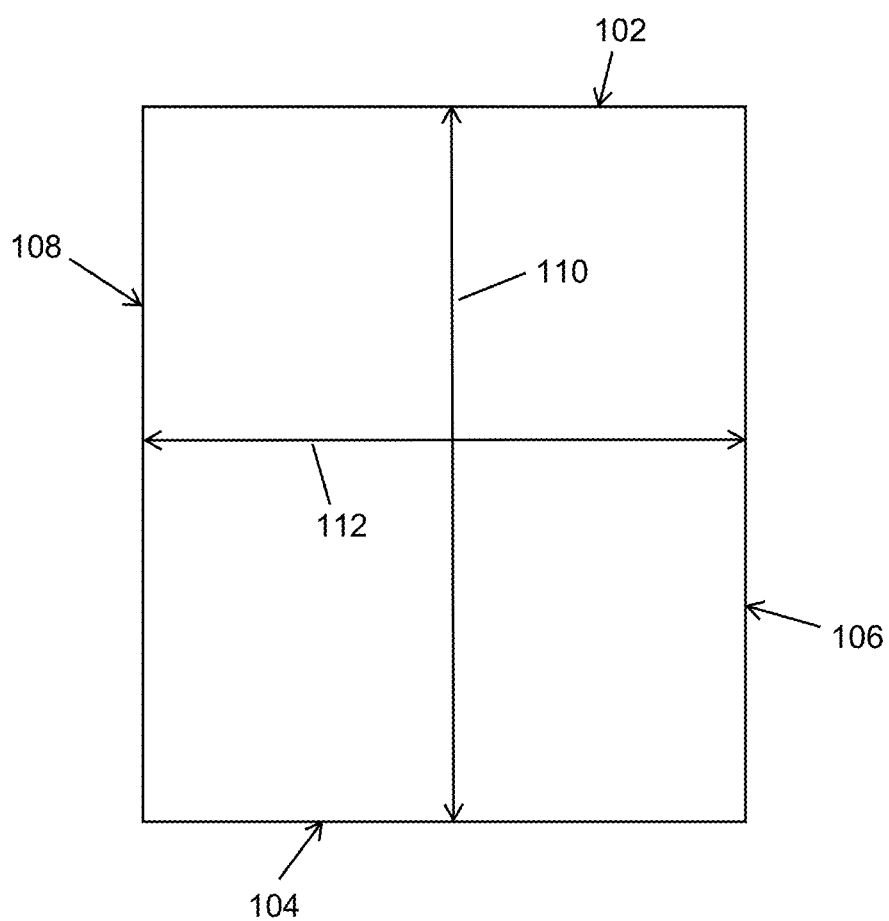
FIG. 6 is a top view of an exemplary floor covering 100 having first and second side edges, first and second end edges, and a length and a width as disclosed herein.

Following application of heat to the overlapped edge region, the moveable bodies of the first and second floor coverings can be moved from the open position to the closed position, as shown in FIG. 5E. In the closed position, the moveable body of the first floor covering can be positioned in contact with (e.g., adjacent to or partially overlapping) the moveable body of the second floor covering. Optionally, the moveable body of the first floor covering can overlie and be secured to the moveable body of the second floor covering. In exemplary aspects, after the moveable bodies are positioned in contact with one another, it is contemplated that the moveable bodies can be spot welded to achieve a desired aesthetic appearance.

In exemplary aspects, it is contemplated that when one end of a floor covering is positioned adjacent to an outer boundary of a subfloor, such as a wall, the floor covering will not typically have a moveable body at the end closest to the outer boundary.

In these aspects, it is contemplated that each floor covering of the first and second floor coverings can be a carpet tile, a broadloom carpet, an area rug, or a synthetic turf floor covering. In further aspects, the plurality of fibers of each floor covering can be synthetic turf fibers.

The floor covering system disclosed herein can offer many advantages to one of skill in the art including, for example, ease of heat welding and proper installation of floor coverings. The movability of the moveable body from the closed position to the open position provides an opportunity to create an improved seam between overlapping regions of the secondary backing materials of adjacent floor coverings, thereby providing a stronger seam and a substantially impermeable barrier. Moreover, because the overlapping region can be welded together while the moveable bodies of adjacent floor coverings are held in the open position, the likelihood of any fibers or tufts becoming positioned between the secondary backing materials of the overlapping region is substantially minimized or eliminated, and the overall size of the weld is significantly reduced compared to conventional methods in which the entire thickness of one floor covering is welded to the entire thickness of another floor covering. Additionally, the seal at the overlapped region can be covered by moving the moveable bodies of adjacent floor coverings to the closed position and, thereby providing a continuous, aesthetically-pleasing appearance.

F. Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A floor covering having opposed first and second side edges and opposed first and second end edges extending between and oriented perpendicularly to the first and second side edges, the floor covering having a width corresponding to a distance between the first and second side edges and a length corresponding to a distance between the first and second end edges, the floor covering comprising: (a) a greige good comprising: (i) a primary backing component defining a face surface and an opposed back surface and having a first portion and a second portion adjoining the first portion, wherein the first and second portions of the primary backing component extend along respective portions of the length of the floor covering; and (ii) a plurality of fibers attached to the primary backing component and extending from the face surface of the primary backing component; and (b) an adhesive layer having a first surface and an opposed second surface and comprising an adhesive composition, wherein the first surface of the adhesive layer is applied to the back surface of the first and second portions of the primary backing component, wherein the portion of the adhesive layer applied to the second portion of the primary backing component and the second portion of the primary backing component cooperate to define a moveable body; and (c) a secondary backing material having an attached portion and at least a first exposable portion, wherein the attached portion is adhered to the first portion of the primary backing component by contact with the second surface of the adhesive layer underlying the first portion of the primary backing component, wherein the moveable body is unattached to the first exposable portion of the secondary backing, and wherein the first exposable portion defines a portion of the first end edge of the floor covering, wherein the moveable body is selectively moveable relative to the first portion of the primary backing component to a position in which at least a portion of the second surface of the adhesive layer of the moveable body is vertically spaced from the first exposable portion of the secondary backing material.

Aspect 2: The floor covering of aspect 1, further comprising a sealing material disposed onto the second surface of the adhesive layer applied to the moveable body, wherein the sealing material is configured to create a barrier between the adhesive layer of the moveable body and the first exposable portion of the secondary backing material.

Aspect 3: The floor covering of aspect 1 or aspect 2, wherein the primary backing component comprises a plurality of primary backing components.

Aspect 4: The floor covering of any one of aspects 1-3, wherein the secondary backing material comprises a plurality of secondary backing materials.

Aspect 5: The floor covering of any one of aspects 1-4, wherein the moveable body is configured for selective pivotal movement relative to the first portion of the primary backing component such that the moveable body is moveable about and between a closed position and an open position, wherein in the closed position, the moveable body overlies the first exposable portion of the secondary backing material and cooperates with the first exposable portion to define the first end edge of the floor covering.

Aspect 6: The floor covering of aspect 5, wherein the moveable body is configured to pivot about a pivot axis defined at an intersection between the first and second portions of the primary backing component such that the moveable body is moveable between the closed position and the open position, wherein the pivot axis is perpendicular to a longitudinal axis of the floor covering extending from the first end edge to the second end edge.

Aspect 7: The floor covering of aspect 6 or aspect 7, wherein in the open position, the moveable body is folded inwardly toward the first portion of the primary backing component, and wherein the pivot axis is spaced from the first end edge by a selected distance corresponding to a length of the moveable body.

Aspect 8: The floor covering of any one of aspects 1-7, wherein the selected distance ranges from about 1 inch to about 25 inches.

Aspect 9: The floor covering of aspect 8, wherein the selected distance ranges from about 5 inches to about 20 inches.

Aspect 10: The floor covering of aspect 9, wherein the selected distance ranges from about 6 inches to about 18 inches.

Aspect 11: The floor covering of any one of aspects 1-10, wherein the greige good further comprises a precoat layer disposed between the back surface of the primary backing component and the adhesive layer.

Aspect 12: The floor covering of any one of aspects 1-11, wherein the primary backing component comprises polypropylene, polyethylene terephthalate, polyethylene, or combinations thereof.

Aspect 13: The floor covering of aspect 12, wherein the primary backing component comprises polypropylene.

Aspect 14: The floor covering of any one of aspects 1-13, wherein the adhesive composition comprises a thermoplastic elastomer.

Aspect 15: The floor covering of aspect 14, wherein the thermoplastic elastomer is a homogeneously branched ethylene polymer.

Aspect 16: The floor covering of aspect 14, wherein the thermoplastic elastomer is a polyethylene elastomer.

Aspect 17: The floor covering of aspect 14, wherein the thermoplastic elastomer is a polypropylene elastomer.

Aspect 18: The floor covering of aspect 14, wherein the thermoplastic elastomer is an ethylene methyl acrylate (EMA) elastomer.

Aspect 19: The floor covering of any one of aspects 1-18, wherein the secondary backing material comprises polypropylene, polyethylene terephthalate, polyethylene, or combinations thereof.

Aspect 20: The floor covering of aspect 19, wherein the secondary backing material comprises polyethylene.

Aspect 21: The floor covering of any one of aspects 1-20, wherein the secondary backing material comprises a woven material, a non-woven material, or a combination thereof.

Aspect 22: The floor covering of any one of aspects 1-21, wherein the secondary backing material further comprises a polymer film applied to a surface of the secondary backing material.

Aspect 23: The floor covering of aspect 22, wherein the polymer film is substantially impermeable to fluids.

Aspect 24: The floor covering of aspect 22, wherein the polymer film is substantially impermeable to gases.

Aspect 25: The floor covering of any one of aspects 22-24, wherein the polymer film is a thermoplastic film.

Aspect 26: The floor covering of any one of aspects 22-25, wherein the polymer film is a composite film.

Aspect 27: The floor covering of any one of aspects 22-26, wherein the polymer film comprises polyethylene, polypropylene, polyurethane, polyester, polyvinylchloride, or a combination thereof.

Aspect 28: The floor covering of aspect 27, wherein the polymer film comprises polyethylene.

Aspect 29: The floor covering of aspect 26, wherein the polymer film is a composite film comprising polyethylene and polypropylene.

Aspect 30: The floor covering of aspect 29, wherein the polymer film comprises a polypropylene core.

Aspect 31: The floor covering of aspect 26, wherein the polymer composite film comprises at least three layers, and wherein each outer layer of the composite film comprises polyethylene.

Aspect 32: The floor covering of any one of aspects 22-31, wherein the polymer film has a thickness of less than about 6 mils.

Aspect 33: The floor covering of aspect 32, wherein the polymer film has a thickness of about 2 to about 4 mils.

Aspect 34: The floor covering of any one of aspects 22-33, wherein the polymer film is an extruded film.

Aspect 35: The floor covering of any one of aspects 22-33, wherein the polymer film is a blown film.

Aspect 36: The floor covering of any one of aspects 22-33, wherein the polymer film is a cast film.

Aspect 37: The floor covering of any one of aspects 22-33, wherein the polymer film is an engineered film.

Aspect 38: The floor covering of any one of aspects 22-37, wherein the polymer film is continuous and substantially free of perforations.

Aspect 39: The floor covering of any one of aspects 1-38, wherein the floor covering is a carpet tile, a broadloom carpet, an area rug, or a synthetic turf floor covering.

Aspect 40: The floor covering of any one of aspects 1-38, wherein the plurality of fibers are synthetic turf fibers.

Aspect 41: The floor covering of any one of aspects 1-40, wherein the primary backing component further comprises a third portion adjoining the first portion of the primary backing component, wherein the first, second, and third portions of the primary backing component extend along respective portions of the length of the floor covering such that the first portion is positioned between the second and third portions relative to the length of the floor covering, wherein the first surface of the adhesive layer is applied to the back surface of the first, second, and third portions of the primary backing component, wherein the portions of the adhesive layer applied to the second and third portions of the primary backing component and the second and third portions of the primary backing component cooperate to define respective first and second moveable bodies, wherein the secondary backing material further comprises a second exposable portion, wherein the second moveable body is unattached to and configured to overlie the second exposable portion of the secondary backing material, wherein the second exposable portion defines a portion of the second end edge of the floor covering, and wherein the second moveable body is selectively moveable relative to the first portion of the primary backing component to a position in which at least a portion of the second surface of the adhesive layer of the second moveable body is vertically spaced from the second exposable portion of the secondary backing material.

Aspect 42: The floor covering of aspect 41, further comprising a sealing material disposed onto the second surfaces of the adhesive layer applied to the first and second moveable bodies, wherein the sealing material is configured to create a barrier between the adhesive layer of the first and second moveable bodies and the first and second exposable portions of the secondary backing material.

Aspect 43: The floor covering of any one of aspects 41-42, wherein the second moveable body is configured for selective pivotal movement relative to the first portion of the primary backing component such that the second moveable body is moveable about and between a closed position and an open position, wherein in the closed position, the second moveable body overlies the second exposable portion of the secondary backing material and cooperates with the second exposable portion to define the second end edge of the floor covering.

Aspect 44: The floor covering of aspect 43, wherein the second moveable body is configured to pivot about a pivot axis defined at an intersection between the first and third portions of the primary backing component such that the second moveable body is moveable between the closed position and the open position, wherein the pivot axis is perpendicular to a longitudinal axis of the floor covering extending from the first end edge to the second end edge.

Aspect 45: The floor covering of aspect 44, wherein in the open position, the second moveable body is folded inwardly toward the first portion of the primary backing component, and wherein the pivot axis at the intersection of the first and third portions of the primary backing is spaced from the second end edge by a selected distance corresponding to a length of the second moveable body.

Aspect 46: A floor covering system, comprising: at least a first and a second floor covering as recited in any one of claims 1-45, wherein the first exposable portion of the secondary backing material of the first floor covering overlies and is welded to the second exposable portion of the secondary backing material of the second floor covering, thereby forming a continuous, substantially impermeable barrier.

Aspect 47: The floor covering system of aspect 46, wherein no fibers of the plurality of fibers are situated between the first exposable portion of the secondary backing material of the first floor covering and the second exposable portion of the secondary backing material of the second floor covering.

Aspect 48: The floor covering system of any one of aspects 46-47, wherein the moveable body of the first floor covering is positioned adjacent to the moveable body of the second floor covering.

Aspect 49: The floor covering system of any one of aspects 46-47, wherein the moveable body of the first floor covering overlies and is secured to the moveable body of the second floor covering.

Aspect 50: The floor covering system of any one of aspects 46-47, wherein the moveable body of the second floor covering overlies and is secured to the moveable body of the first floor covering.

Aspect 51: A method of making a floor covering, comprising: (a) applying an adhesive layer onto a back surface of a primary backing component of at least one greige good, the at least one greige good further comprising a plurality of fibers attached to the primary backing component and extending from a face surface of the primary backing component; and (b) laminating an attached portion of the secondary backing material onto the adhesive layer of a first portion of the primary backing component of the at least one greige good, wherein an exposable portion of the secondary backing material is unattached to a second portion of the primary backing component that adjoins the first portion of the primary backing component and at least partially overlies the exposable portion of the secondary backing material, wherein the exposable portion of the secondary backing material defines a portion of an edge of the floor covering.

Aspect 52: The method of making a floor covering of aspect 51, wherein the second portion of the primary backing component is pivotally moveable between a closed position and an open position relative to a pivot axis defined at the intersection between the first and second portions of the primary backing component.

Aspect 53: The method of making a floor covering of aspect 52, further comprising pivoting the second portion of the primary backing component from the closed position to the open position to expose at least a portion of the exposable portion of the secondary backing material.

Aspect 54: The method of making a floor covering of aspect 53, further comprising applying a sealing material to the second portion of the primary backing component by contact with the second surface of the portion of the adhesive layer applied to the second portion of the primary backing component, wherein application of the sealing material to the second portion of the primary backing component forms a barrier between the second portion of the primary backing component and the exposable portion of the secondary backing material when the second portion of the primary backing component is in the closed position.

Aspect 55: The method of making a floor covering of aspect 54, further comprising moving the second portion of the primary backing component from the open position to the closed position following application of the sealing material to the second portion of the primary backing component.

Aspect 56: A method of installing a floor covering, comprising: (a) laying down a first floor covering on a subfloor, the first floor covering comprising a secondary backing material having an attached portion and an exposable portion, wherein the attached portion is adhered to a first portion of a primary backing component by contact with an adhesive layer, and wherein a second portion of the primary backing component adjoins the first portion of the primary backing component of the first floor covering and is unattached from the secondary backing material of the first floor covering, wherein the second portion of the primary backing component at least partially overlies the exposable portion of the secondary backing material of the first floor covering, and wherein the exposable portion of the secondary backing material defines a portion of a first edge of the first floor covering; (b) laying down a second floor covering on the subfloor, the second floor covering comprising a secondary backing material having an attached portion and an exposable portion, wherein the attached portion is adhered to a first portion of a primary backing component by contact with an adhesive layer, and wherein a second portion of the primary backing component adjoins the first portion of the primary backing component of the second floor covering and is unattached from the secondary backing material of the second floor covering, wherein the second portion of the primary backing component at least partially overlies the exposable portion of the secondary backing material of the second floor covering, and wherein the exposable portion of the secondary backing material defines a portion of a first edge of the second floor covering; (c) overlapping the exposable portion of the secondary backing material of the first floor covering with the exposable portion of the secondary backing material of the second floor covering to form an overlapped edge region; and (d) applying heat to the overlapped edge region of the first floor covering and the second floor covering to weld the exposable portions of the secondary backing materials of the first and second floor coverings together.

Aspect 57: The method of installing a floor covering of aspect 56, wherein the second portion of the primary backing component of each of the first and second floor coverings is pivotally moveable between a closed position and an open position relative to a pivot axis defined at the intersection between the first and second portions of the primary backing components of each respective floor covering.

Aspect 58: The method of installing a floor covering of aspect 57, further comprising pivoting the second portions of the primary backing component from the closed position to the open position to permit overlapping of the exposable portions of the secondary backing materials of the first and second floor coverings.

Aspect 59: The method of installing a floor covering of aspect 58, wherein each floor covering of the first and second floor coverings comprises a plurality of fibers attached to the primary backing component and extending from a face surface of the primary backing component, and wherein no fibers of the plurality of fibers of the first and second floor coverings are situated within the overlapped edge region between the exposable portions of the secondary backing materials of the first and second floor coverings.

Aspect 60: The method of installing a floor covering of aspect 59, further comprising moving the second portions of the primary backing components of the first and second floor coverings from the open position to the closed position following application of heat to the overlapped edge region.

Aspect 61: The method of installing a floor covering of aspect 60, wherein, in the closed position, the second portion of the primary backing component of the first floor covering is positioned adjacent to the second portion of the primary backing component of the second floor covering.

Aspect 62: The method of installing a floor covering of aspect 61, wherein the second portion of the primary backing component of the first floor covering overlies and is secured to the second portion of the primary backing component of the second floor covering.

Aspect 63: The method of installing a floor covering of any one of aspects 56-62, wherein the step of applying heat comprises applying heat and compressive force at the same time to bond the exposable portion of the secondary backing material of the first floor covering to the exposable portion of the secondary backing material of the second floor covering.

Aspect 64: The method of installing a floor covering of any one of aspects 56-63, wherein the step of applying heat is accomplished by rolling a heat welder apparatus over the overlapped edge region and operating the heat welder apparatus while the head welder apparatus is rolled over the overlapped edge region.

Aspect 65: The method of installing a floor covering of any one of aspects 56-64, wherein each floor covering of the first and second floor coverings is a carpet tile, a broadloom carpet, an area rug, or a synthetic turf floor covering.

Aspect 66: The method of installing a floor covering of any one of aspects 59-65, wherein the plurality of fibers of each floor coveting are synthetic turf fibers.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, certain changes and modifications may be practiced within the scope of the appended claims.

What is claimed is:

1. A floor covering comprising:
a primary backing component defining a face surface and an opposed back surface and having a first portion and a second portion adjoining the first portion, wherein the first and second portions of the primary backing component extend along respective portions of a length of the floor covering; and
a plurality of fibers attached to the primary backing component and extending from the face surface of the primary backing component;
an adhesive layer having a first surface and an opposed second surface, wherein the first surface of the adhesive layer is applied to the back surface of the first and second portions of the primary backing component, wherein the portion of the adhesive layer applied to the second portion of the primary backing component and the second portion of the primary backing component cooperate to define a moveable body; and
a secondary backing material having an attached portion and at least a first exposable portion, wherein the attached portion is adhered to the first portion of the primary backing component by contact with the second surface of the adhesive layer underlying the first portion of the primary backing component, wherein the moveable body is unattached to the first exposable portion of the secondary backing,
wherein the moveable body is selectively pivotally moveable relative to the first portion of the primary backing component.

2. The floor covering of claim 1, further comprising a sealing material disposed onto the second surface of the adhesive layer applied to the moveable body, wherein the sealing material is configured to create a barrier between the adhesive layer of the moveable body and the first exposable portion of the secondary backing material.

3. The floor covering of claim 1, wherein the moveable body is moveable about and between a closed position and an open position, wherein in the closed position, the moveable body overlies the first exposable portion of the secondary backing material and cooperates with the first exposable portion to define a first end edge of the floor covering.

4. The floor covering of claim 3, wherein the moveable body is configured to pivot about a pivot axis defined at an intersection between the first and second portions of the primary backing component such that the moveable body is moveable between the closed position and the open position, wherein the pivot axis is perpendicular to a longitudinal axis of the floor covering extending from the first end edge to an opposing second end edge, wherein in the open position, the moveable body is folded inwardly toward the first portion of the primary backing component, and wherein the pivot axis is spaced from the first end edge by a selected distance corresponding to a length of the moveable body.

5. The floor covering of claim 1, wherein each of the primary backing component and the secondary backing component comprises polypropylene, polyethylene terephthalate, polyethylene, or combinations thereof.

6. The floor covering of claim 1, wherein the adhesive layer comprises a thermoplastic elastomer selected from the group consisting of a polyethylene elastomer, a polypropylene elastomer, and an ethylene methyl acrylate (EMA) elastomer.

7. The floor covering of claim 1, wherein the secondary backing material further comprises a polymer film, wherein the polymer film is continuous and substantially free of perforations, and wherein the polymer film is substantially impermeable to at least one of fluid or gas.

8. The floor covering of claim 7, wherein the polymer film is a thermoplastic film or a composite film and comprises polyethylene, polypropylene, polyurethane, polyester, polyvinylchloride, or a combination thereof.

9. The floor covering of claim 7, wherein the polymer film comprises a polypropylene core.

10. The floor covering of claim 8, wherein the polymer composite film comprises at least three layers, and wherein each outer layer of the composite film comprises polyethylene.

11. The floor covering of claim 7, wherein the polymer film is an extruded film, a blown film, a cast film, an engineered film, or combinations thereof.

12. The floor covering of claim 1, wherein the plurality of fibers are synthetic turf fibers.

13. The floor covering of claim 1, wherein the primary backing component further comprises a third portion adjoining the first portion of the primary backing component, wherein the first, second, and third portions of the primary backing component extend along respective portions of the length of the floor covering such that the first portion is positioned between the second and third portions relative to the length of the floor covering, wherein the first surface of the adhesive layer is applied to the back surface of the first, second, and third portions of the primary backing component, wherein the portions of the adhesive layer applied to the second and third portions of the primary backing component and the second and third portions of the primary backing component cooperate to define respective first and second moveable bodies, wherein the secondary backing material further comprises a second exposable portion, wherein the second moveable body is unattached to and configured to overlie the second exposable portion of the secondary backing material, wherein the second exposable portion defines a portion of a second end edge of the floor covering that opposes the first end edge, and wherein the second moveable body is selectively pivotally moveable relative to the first portion of the primary backing component.

14. The floor covering of claim 13, further comprising a sealing material disposed onto the second surfaces of the adhesive layer applied to the first and second moveable bodies, wherein the sealing material is configured to create a barrier between the adhesive layer of the first and second moveable bodies and the first and second exposable portions of the secondary backing material.

15. The floor covering of claim 13, wherein the second moveable body is moveable about and between a closed position and an open position, wherein in the closed position, the second moveable body overlies the second exposable portion of the secondary backing material and cooperates with the second exposable portion to define the second end edge of the floor covering.

16. The floor covering of claim 15, wherein the second moveable body is configured to pivot about a pivot axis defined at an intersection between the first and third portions of the primary backing component such that the second moveable body is moveable between the closed position and the open position, wherein the pivot axis is perpendicular to a longitudinal axis of the floor covering extending from the first end edge to the second end edge.

17. The floor covering of claim 16, wherein in the open position, the second moveable body is folded inwardly toward the first portion of the primary backing component, and wherein the pivot axis at the intersection of the first and third portions of the primary backing is spaced from the second end edge by a selected distance corresponding to a length of the second moveable body.

18. A floor covering system, comprising:
at least a first and a second floor covering, each floor covering comprising:
a primary backing component defining a face surface and an opposed back surface and having a first portion and a second portion adjoining the first portion, wherein the first and second portions of the primary backing component extend along respective portions of a length of the floor covering; and
a plurality of fibers attached to the primary backing component and extending from the face surface of the primary backing component;
an adhesive layer having a first surface and an opposed second surface, wherein the first surface of the adhesive layer is applied to the back surface of the first and second portions of the primary backing component, wherein the portion of the adhesive layer applied to the second portion of the primary backing component and the second portion of the primary backing component cooperate to define a moveable body; and
a secondary backing material having an attached portion and at least a first exposable portion, wherein the attached portion is adhered to the first portion of the primary backing component by contact with the second surface of the adhesive layer underlying the first portion of the primary backing component, wherein the moveable body is unattached to the first exposable portion of the secondary backing,
wherein the moveable body is selectively pivotally moveable relative to the first portion of the primary backing component, and
wherein the first exposable portion of the secondary backing material of the first floor covering overlies and is welded to the first exposable portion of the secondary backing material of the second floor covering, thereby forming a continuous, substantially impermeable barrier.

19. The floor covering system of claim 18, wherein no fibers of the plurality of fibers are situated between the first exposable portion of the secondary backing material of the first floor covering and the first exposable portion of the secondary backing material of the second floor covering.

20. A method of installing a floor covering, comprising:
(a) laying down a first floor covering on a subfloor, the first floor covering comprising a secondary backing material having an attached portion and an exposable portion, wherein the attached portion is adhered to a first portion of a primary backing component by contact with an adhesive layer, and wherein a second portion of the primary backing component adjoins the first portion of the primary backing component of the first floor covering and is unattached from the secondary backing material of the first floor covering, wherein the second portion of the primary backing component at least partially overlies the exposable portion of the secondary backing material of the first floor covering, and wherein the exposable portion of the secondary backing material defines a portion of a first edge of the first floor covering;
(b) laying down a second floor covering on the subfloor, the second floor covering comprising a secondary backing material having an attached portion and an exposable portion, wherein the attached portion is adhered to a first portion of a primary backing component by contact with an adhesive layer, and wherein a second portion of the primary backing component adjoins the first portion of the primary backing component of the second floor covering and is unattached from the secondary backing material of the second floor covering, wherein the second portion of the primary backing component at least partially overlies the exposable portion of the secondary backing material of the second floor covering, and wherein the exposable portion of the secondary backing material defines a portion of a first edge of the second floor covering;
(c) overlapping the exposable portion of the secondary backing material of the first floor covering with the exposable portion of the secondary backing material of the second floor covering to form an overlapped edge region; and
(d) applying heat to the overlapped edge region of the first floor covering and the second floor covering to weld the exposable portions of the secondary backing materials of the first and second floor coverings together.

* * * * *